US011801662B2

(12) United States Patent
Busche et al.

(10) Patent No.: US 11,801,662 B2
(45) Date of Patent: Oct. 31, 2023

(54) CEMENTITIOUS PANELS WITH POLYMERIC-FILM FACING MATERIAL

(71) Applicant: National Gypsum Properties, LLC, Charlotte, NC (US)

(72) Inventors: Bradley J. Busche, Shelby, NC (US); Ma-Ikay Miatudila, Monroe, NC (US); Brian G. Randall, Charlotte, NC (US); Joseph J. Bailey, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 631 days.

(21) Appl. No.: 16/726,988

(22) Filed: Dec. 26, 2019

(65) Prior Publication Data

US 2020/0207060 A1 Jul. 2, 2020

Related U.S. Application Data

(60) Provisional application No. 62/785,341, filed on Dec. 27, 2018.

(51) Int. Cl.
| | |
|---|---|
| *C08K 3/22* | (2006.01) |
| *C08K 5/00* | (2006.01) |
| *B28B 11/04* | (2006.01) |
| *B32B 13/12* | (2006.01) |
| *B32B 3/26* | (2006.01) |
| *B32B 27/20* | (2006.01) |
| *B32B 13/08* | (2006.01) |
| *B32B 7/12* | (2006.01) |
| *B32B 27/34* | (2006.01) |
| *B32B 13/02* | (2006.01) |
| *B32B 13/14* | (2006.01) |
| *B32B 27/32* | (2006.01) |
| *B32B 27/36* | (2006.01) |
| *B28B 19/00* | (2006.01) |

(52) U.S. Cl.
CPC .......... *B32B 13/12* (2013.01); *B28B 19/0046* (2013.01); *B32B 3/26* (2013.01); *B32B 27/20* (2013.01); *C08K 5/0041* (2013.01); *B32B 2255/24* (2013.01); *B32B 2255/28* (2013.01); *B32B 2264/102* (2013.01); *B32B 2264/105* (2013.01); *B32B 2305/026* (2013.01); *B32B 2305/30* (2013.01); *B32B 2307/7265* (2013.01); *B32B 2607/00* (2013.01); *C08K 2201/005* (2013.01)

(58) Field of Classification Search
None
See application file for complete search history.

(56) References Cited

U.S. PATENT DOCUMENTS

| | | | |
|---|---|---|---|
| 7,438,972 B2 | 10/2008 | Faler et al. | |
| 8,277,931 B1 | 10/2012 | Kumar | |
| 2005/0255308 A1 | 11/2005 | Gregg et al. | |
| 2019/0071837 A1* | 3/2019 | Krasnoff | B32B 7/09 |

FOREIGN PATENT DOCUMENTS

CA 1189434 6/1985

* cited by examiner

*Primary Examiner* — Sheeba Ahmed
(74) *Attorney, Agent, or Firm* — Dority & Manning, P.A.

(57) ABSTRACT

Provided are cementitious panels that include a cementitious core material and a plurality of sheets of facing material surrounding the cementitious core material, in which at least one of the plurality of sheets of facing material includes a polymeric-film. The polymeric film may include a thermoplastic composition that has a polymeric matrix including one or more polymeric materials. Additionally, the thermoplastic composition may optionally include a filler material. Additionally, provided are methods of manufacturing such cementitious panels.

22 Claims, 5 Drawing Sheets

CEMENTITIOUS PANELS WITH POLYMERIC-FILM FACING MATERIAL

CROSS-REFERENCE TO RELATED APPLICATION

The present application claims filing benefit of U.S. Provisional Patent Application Ser. No. 62/785,341 having a filing date of Dec. 27, 2018, and which is incorporated herein by reference in its entirety.

BACKGROUND

Water penetration into and through cementitious panels is an area of major concern in the building and construction industry. Cementitious panels are generally formed of a cementitious core material that contains a hydraulically setting material such as gypsum, cement, or the like. The cementitious core material is typically sandwiched between sheets of facing material such as paper or paperboard, or woven or non-woven fibers or filaments. Bulk water or moisture that penetrates through the facing material can promote the growth of organisms, such as mold and mildew, which can lead to various health conditions. Additionally, water or moisture can deteriorate the cementitious panels. For example, the composition of the panels may become dissolved in the wet environment, the cementitious core material may crack due to freeze-thaw cycles, and/or the facing material may separate from the cementitious core material. The facing material of a cementitious panel may be coated with a moisture barrier; however, such coatings have a limited range of properties and performance capabilities.

It would be desirable to provide cementitious panels that have a polymeric-film facing material; however, previous efforts to add polymeric-film facing materials to cementitious panels have proved unsuitable for traditional production processes used to form the cementitious panels. For example, previous polymeric-film facing materials tended to inhibit evacuation of moisture from the core of the cementitious panel, interfering with the curing process of the cementitious material in the panel and removal of excess moisture from the panel during kiln drying.

As a result, there remains a need for improved cementitious panels that have facing materials with improved moisture barrier properties and other performance capabilities.

SUMMARY OF THE INVENTION

Aspects and advantages will be set forth in part in the following description, or may be obvious from the description, or may be learned through practicing the presently disclosed subject matter.

In one aspect, the present disclosure embraces cementitious panels. An exemplary cementitious panel may include a cementitious core material, and a plurality of sheets of facing material surrounding the cementitious core material. The plurality of sheets of facing material may include a first sheet of facing material and a second sheet of facing material. The first sheet of facing material and/or the second sheet of facing material may include a polymeric-film containing a thermoplastic composition. The thermoplastic composition may have a polymeric matrix that includes one or more polymeric materials. The thermoplastic composition may optionally include a filler material.

In another aspect, the present disclosure embraces methods of manufacturing a cementitious panel. An exemplary method may include conveying a slurry of cementitious core material and a plurality of sheets of facing material, forming a continuous length of cementitious panel material comprising the slurry of cementitious core material surrounded by the plurality of sheets of facing material, and cutting the continuous length of cementitious panel material laterally to a desired length, providing a cementitious panel. The plurality of sheets of facing material may include a first sheet of facing material and a second sheet of facing material, and the first sheet of facing material and/or the second sheet of facing material may include a polymeric-film.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1A:
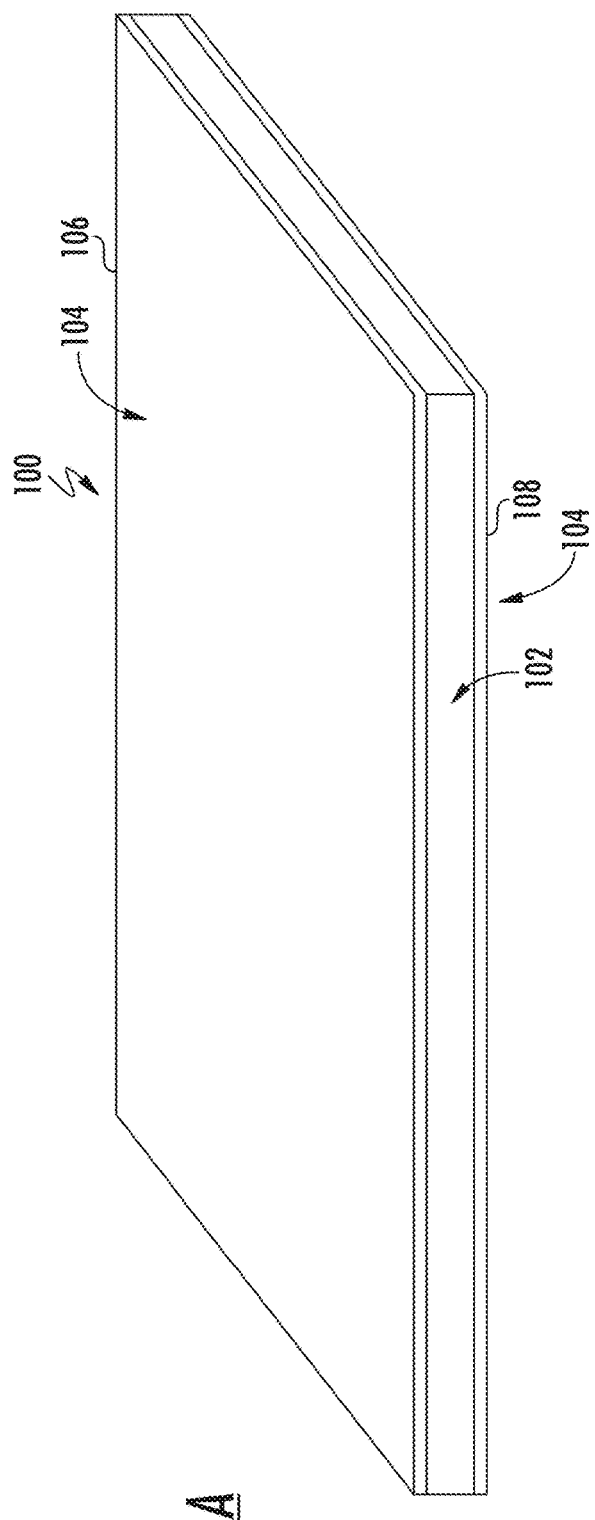
FIG. 1A schematically shows a perspective view of an exemplary cementitious panel.

Repeat use of reference characters in the present specification and drawings is intended to represent the same or analogous features or elements of the present disclosure.

DETAILED DESCRIPTION OF PARTICULAR EMBODIMENTS

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally provides cementitious panels that include a polymeric-film facing material and methods for manufacturing such cementitious panels that include a polymeric-film facing material. The polymeric-film facing material contains a thermoplastic composition that includes a polymer matrix and a filler material. The polymeric-film facing material may be used instead of and/or in addition to typical facing materials formed of paper or paperboard, or woven or non-woven fibers or filaments. Advantageously, the polymeric-film facing material imparts desired moisture barrier properties and breathability properties without requiring an additional moisture barrier coating. In some embodiments, the polymeric-film facing material may be substantially impervious to liquid water yet "breathable" in the sense of being pervious to water vapor and gases. In other embodiments, the polymeric film facer material may be "non-breathable" in the sense of being substantially impervious to water vapor and gases.

Surprisingly, the polymeric-film facing material adhered to the core material without requiring a modification or change to the starch binder typically included in the core material. Without being bound to any theory, it is believed that the film's filler material facilitates bonding between the polymeric film-facer and the core material.

The cementitious panels presently disclosed include construction materials commonly referred to as wallboard, drywall, gypsum board, cement board, backer board, fiber cement siding, roof board, and the like. These materials may be used for interior or exterior construction. Interior uses include finishing interior walls and ceilings and providing backing material for flooring such as tile, stone and the like. Exterior uses include exterior siding and roofing and providing backing material for other exterior siding or roofing materials such as stucco, masonry, shingles, and the like. Additionally, cementitious panels may provide fire resistance and sound control. Cementitious panels may be formed with any desired dimensions. Standard dimensions for wallboard applications typically call for panels that are about 4-foot wide and about 8-feet to 16-feet long, with thicknesses of about ¼-inch to 2-inches. Of course, cementitious panels may also be manufactured according to other standard or non-standard dimensions.

The presently disclosed cementitious panels containing a polymeric-film facing material may exhibit improved fastener holding capabilities. Improved fastener holding capabilities may be provided, for example, by a polymeric-film facing material having elastic properties that allow the facing material to expand when penetrated by a fastener and then contract around the perimeter of the fastener. Additionally, when the polymeric-film facing material includes a water or moisture-swellable material, void spaces between a fastener and the facing material may be filled as the material swells from the absorption of water or moisture, thereby providing a tighter fit with the fastener. Such fastener holding capabilities may be measured, for example, using a nail pull resistance test according to ASTM C 473-99 and/or ASTM C1396.

Cementitious panels containing a polymeric-film facing material may exhibit improved strength properties relative to cementitious panels that do not include a polymeric-film facing material. For example, the polymeric-film facing materials may exhibit improved ductility and elastic modulus which may translate to improved ductility and elastic modulus of the cementitious panel. The improved strength properties may allow for lighter board weights. In some embodiments, the presently disclosed cementitious panels may be highly flexible, allowing cementitious panels to be installed in curved surfaces such as curved walls and the like.

In some embodiments, the presently disclosed cementitious panels may include materials that provide enhanced fire-resistance capabilities. For example, a cementitious panel may include a polymeric-film facing material that contains filler materials, additives, and/or coatings that provide enhanced fire resistance. Additionally, a polymeric-film facing material may include water-swellable and/or heat-swellable (i.e., intumescent) materials that may provide enhanced fire resistance capabilities. When exposed to water and/or heat, as applicable, such swellable materials may close gaps, cracks, pores and the like in a polymeric-film facing material, thereby restricting air flow needed for combustion and/or thermal transmission. In even further embodiments, water from fire suppression sprinklers triggered during a fire may be absorbed by swellable materials in a polymeric-film facing material, thereby restricting air flow needed for combustion. The fire-resistance capabilities of a cementitious panel may be measured in accordance with ASTM E119, UL U305, UL U419, and/or UL U423 test methods, among others.

The presently disclosed cementitious panels may additionally/or alternatively include polymeric-film facing materials with fillers and/or coatings that contain materials capable of removing volatile organic compounds ("VOCs") from the surrounding area such as an indoor area where the cementitious panels are installed. VOCs include organic chemical compounds whose composition makes it possible for them to evaporate under normal indoor atmospheric conditions of temperature and pressure, and includes any organic compound having an initial boiling point less than or equal to 250° C. measured at a standard atmospheric pressure of 101.3 kPa. Exemplary VOCs include propane, butane, formaldehyde, and toluene. In some embodiments, a polymeric-film facing material may include one or more materials capable of adsorbing VOCs. Additionally, or in the alternative, a polymeric-film facing may include a coating that contains one or more photocatalytic materials capable of converting VOCs to harmless substances in the presence of UV or other light irradiation.

The presently disclosed cementitious panels may include a polymeric-film facing material, which may provide a surface that is substantially impervious to water/moisture yet breathable to water vapor or gasses. Additionally, such facing material may provide a highly smooth surface finish, including a level 5 drywall finish.

It will be appreciated that the features and advantages of the presently disclosed cementitious panels may be provided individually or in combination. Exemplary embodiments will now be discussed in further detail with reference to the accompanying figures. It is understood that terms "upstream" and "downstream" refer to the relative direction that a material travels with respect to a process. For example, "upstream" refers to the direction from which a material travels, and "downstream" refers to the direction to which the material travels. It is also understood that terms such as "top", "bottom", "outward", "inward", and the like are words of convenience and are not to be construed as limiting terms. As used herein, the terms "first", "second", "third", and "fourth" may be used interchangeably to distinguish one component from another and are not intended to signify importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value or the precision of the methods or machines for constructing or manufacturing the components and/or systems.

Figure 1B:
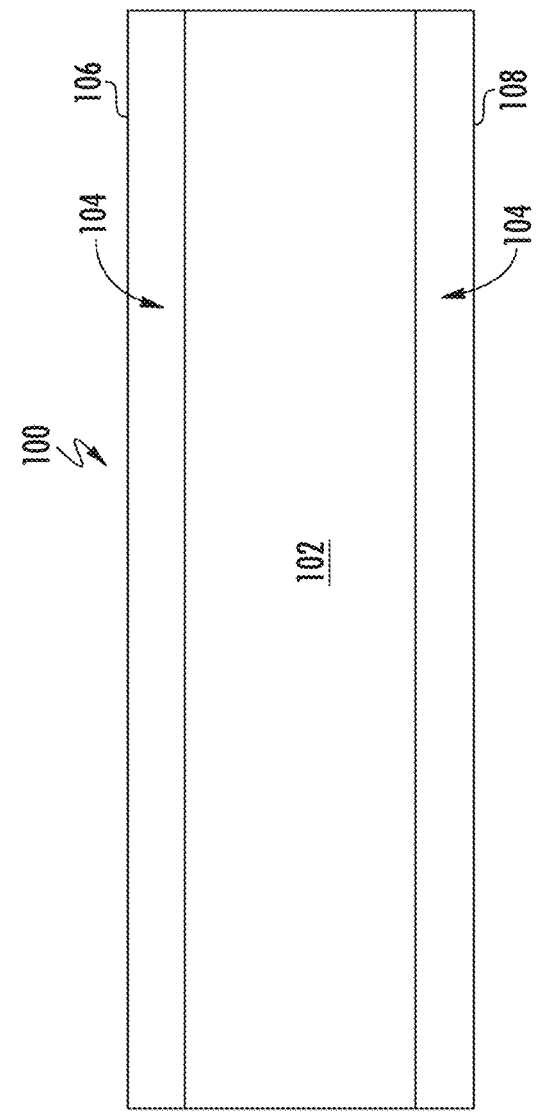
FIG. 1B schematically shows a cross-sectional view of an exemplary cementitious panel.

Now referring to FIGS. 1A and 1B, an exemplary cementitious panel 100 is shown. The cementitious panel 100 includes a core material 102 sandwiched between by a plurality of sheets of facing material 104. The cementitious panel 100 includes a front sheet 106 and a back sheet 108 of facing material 104. In accordance with the present disclosure, the front sheet 106 and/or the back sheet 108 of facing material 104 may be a polymeric-film facing material. An adhesive or binder may be included in the core material 102 to adhere the sheets of facing material 104 to the core material 102. The adhesive or binder may include starch, dextrin, polyester resin, poly(vinyl acetate), poly(ethylene-co-vinyl acetate), polyvinyl alcohol, styrene butadiene, epoxies, acrylics, polyimides, polyurethanes, and so forth.

The core material 102 of a cementitious panel 100 may include any hydraulically setting material, such as gypsum, synthetic gypsum, various cement types including but not limited to Portland cements (e.g., Portland blast-furnace slag cement or blast furnace cement, Portland-fly ash cement, Portland pozzolan cement, Portland silica fume cement, masonry cements, expansive cements), non-hydraulic cements, pozzolan-lime cements, slag-lime cements, supersulfated cements, calcium sulfoaluminate cements, "natural" cements, geopolymer cements, polymer cements, and blends thereof. The core material 102 may be formulated by preparing a slurry that includes water, one or more of such hydraulically setting materials, and other additives such as setting accelerants, antidesiccants, waterproofing agents, dispersants, set retarders, surfactants, strength enhancers, and reinforcing materials such as organic or inorganic aggregates, glass fibers, and the like.

Typically, cementitious panels 100 commonly referred to as wallboard, drywall, gypsum board, and the like are formed from a cementitious core material 102 that primarily contains gypsum. Gypsum commonly refers to a mineral composed primarily of calcium sulfate dihydrate, which has the chemical formula $CaSO_4.2H_2O$ Gypsum may be obtained from naturally occurring calcium sulfate in anhydrous, dihydrate, or hemihydrate state. Alternatively, gypsum may be obtained synthetically, from industrial scrubbers using a flue-gas desulfurization process. A slurry of gypsum to be used as a core material 102 for a cementitious panel may be formed by mixing water with powdered anhydrous calcium sulfate ($CaSO_4$) and/or calcium sulfate hemihydrate ($CaSO_4.\frac{1}{2}H_2O$), commonly referred to as calcined gypsum, stucco, or plaster of Paris. Calcined gypsum is typically prepared by heating pulverized uncalcined gypsum rock in a mill such as a rotary kiln, hammer mill, impact mill, and others or simultaneously heating and pulverizing uncalcined gypsum in a mill to yield stucco predominantly including calcium sulfate hemihydrate and to release water vapor. Calcined gypsum (i.e., calcium sulfate hemihydrate) has the desirable property of being chemically reactive with water and will "set" rather quickly when the two are mixed together, yielding calcium sulfate dihydrate.

Typically, cementitious panels 100 commonly referred to as cement board, backer board, fiber cement siding, and the like are formed from a cementitious core material 102 that primarily contains Portland cement and organic or inorganic aggregate. Portland cement commonly refers to a blend of hydraulically setting materials that primarily includes hydraulic calcium silicates ($3CaO.SiO_2$ and $2CaO.SiO_2$). Additionally, Portland cement may include one or more forms of calcium sulfate, magnesium oxide, aluminum oxide, and iron oxide. Organic aggregate includes cellulose fibers, wood flakes, and the like.

The facing material 104 may take the form of a polymeric-film. In accordance with the present disclosure, at least the front sheet 106 or the back sheet 108 takes the form of a polymeric-film. In one embodiment, the front sheet 106 of facing material 104 is a polymeric-film. When the front sheet 106 is a polymeric-film, the back sheet 108 may include a paper or paperboard facing material, woven or non-woven fibers or filaments, and/or a polymeric-film facing material. In another embodiment, the back sheet 108 is a polymeric-film. When the back sheet 108 is a polymeric-film, the front sheet 106 may include a paper or paperboard material, woven or non-woven fibers or filaments, and/or a polymeric-film. In yet another embodiment, both the front sheet 106 and the back sheet 108 of facing material 104 are a polymeric-film.

The polymeric-film contains a thermoplastic composition. The thermoplastic composition may include a polymeric matrix and a filler material. The filler material may be at least partly incompatible with the polymeric matrix, allowing the filler material to become dispersed within the polymeric matrix. In some embodiments, the filler material may be compatibilized at least in part by a surface treatment. In some embodiments, the compatibilized filler material may nevertheless be at least partially incompatible with the polymeric matrix. In some embodiments, the filler material may not include a surface treatment. The thermoplastic composition may be formed into a film by drawing the film through an extruder, calendar, press, or the like so as to provide a drawn polymeric film. When drawing the film, the thermoplastic composition is subjected to deformation and elongation strain. The incompatibility of the filler material with the polymeric matrix leads to debonding in the polymeric matrix adjacent to the filler material, thereby forming a network of interconnected pores throughout the polymeric matrix. Thus, a polymeric-film facing material may include a drawn thermoplastic composition, and the drawn thermoplastic composition may include a polymeric matrix, a filler material, and a network of interconnected pores throughout the polymeric matrix. Additionally, one or both surfaces of the polymeric-film may be coated with a dispersion of the filler material. Whether dispersed within the polymeric matrix or coated on a surface of the polymeric-film, the filler material imparts desired properties to the cementitious panels formed with the polymeric-film as described herein. For example, the filler material may be utilized to provide a porous network throughout the polymeric matrix, thereby making the thermoplastic composition breathable or pervious to water vapor and gases.

In some embodiments, however, the thermoplastic composition may not include a filler material. Such a thermoplastic composition may be non-breathable or substantially impervious to water vapor or gases.

In addition to the matrix polymers and filler materials described herein, the thermoplastic composition may additionally contain a wide variety of conventional additives. For example, the thermoplastic composition may include processing aids, stabilizers (e.g., heat stabilizers, ultra violet light stabilizers, etc.), antidegradants (e.g., antioxidants and/ or antiozonants), biocides, antifungal agents, viscosity modifiers, plasticizers, reinforcing additives, strength enhancers, anti-skid compositions, colorants, pigments, and the like. For instance, colorants or pigments may be added to provide the facing with a desired color characteristic. Such additives each are typically included in amount of less than 15 wt. %, such as less than 5 wt. %, such as less than 1 wt. %.

A polymeric-film facing material may be provided with any desired thickness, as may be selected for the particular application and performance requirements. Typically, the polymeric-film facing material may have a thickness ranging from 0.5 µm to 500 µm, such as from 1 µm to 400 µm, such as from 10 µm to 300 µm, such as from to 50 µm to 200 µm, such as from to 75 µm to 150 µm. The polyolefin may have a thickness of at least 0.5 µm, such as at least 1 µm, such as at least 5 µm, such as at least 10 µm, such as at least 25 µm, such as at least 50 µm, such as at least 100 µm, such as at least 150 µm, such as at least 200 µm, such as at least 300 µm, such as at least 400 µm. The polymeric-film facing material may have a thickness of 500 µm or less, such as 450 µm or less, such as 400 µm or less, such as 300 µm or less, such as 200 µm or less, such as 150 µm or less, such as 100 µm or less, such as 75 µm or less, such as 50 µm or less, such as 25 µm or less, such as 10 µm or less, such as 5 µm or less.

Matrix Polymer

The polymeric matrix may include one or more matrix polymers, such as one or more polyolefins or other polymeric materials, which may be in the form of a single polymer or a mixture or combination of polymers. The polymeric matrix may include homopolymers, copolymers, random copolymers, block copolymers, graft copolymers, atactic polymers, isotactic polymers, syndiotactic polymers, linear polymers, and/or branched polymers. When mixtures of polymers are used, the mixture may be homogeneous, or the mixture may include two or more polymeric phases. Suitable polymeric materials include, for example, polyolefins, polyesters, and/or polyamides. Additional suitable polymeric materials include, for example, polyacrylates, polycarbonates, polycaprolactones, polyethers, poly(ester-amides), poly(ether-esters), poly(halo-substituted olefins), poly(hexamethylene adipamide), polyimides, polymethacrylates, poly(methyl methacrylate), poly(omega-aminoundecanoic acid), polypropylene (atactic, isotactic, or syndiotactic), polysilanes, polysiloxanes, polystyrenes, polysulfides, polyureas, polyurethanes, poly(urethane-ureas), poly(vinyl acetate), poly(vinyl chloride), poly(vinyl esters), poly(vinyl halides), poly(vinylidene chloride), poly(vinylidene halides), polystyrenes, poly(silane-siloxanes), and combinations thereof.

In one embodiment, the polymeric material may include a polyolefin. The polyolefin may be an ethylene polymer, a propylene polymer, or a mixture thereof. In one embodiment, the polyolefin comprises an ethylene polymer. Examples of suitable ethylene polymers include high density polyethylene, low density polyethylene, ultrahigh molecular weight polyethylene, polytetrafluoroethylene, polyvinylidene difluoride, polytetrafluoroethylene, copolymers of ethylene and acrylic acid, copolymers of ethylene and methacrylic acid, copolymers of vinylidene chloride and vinyl acetate, copolymers of vinylidene chloride and vinyl chloride, copolymers of ethylene and propylene, and copolymers of ethylene and butane.

Filler Materials

The filler material may include finely divided organic or inorganic particles of a micro-scale and/or nano-scale size. The term "organic" refers to a natural or synthetic carbon-based compound or material, and the term "inorganic" refers to any compound or material that is not organic. In accordance with the present disclosure, a filler material may include one or more organic filler materials and/or inorganic filler materials. Mixtures of any organic and/or inorganic filler materials may also be used. The particular filler materials used may be selected based on the specific application and performance requirements thereof. Such filler materials are typically capable of being dispersed in a polymeric matrix in the form of particles and/or discrete domains of a micro-scale and/or nano-scale size. The micro-scale and/or nano-scale particles and/or domains may have any one or more of a variety of different shapes, including cylindrical, elliptical, flake-like, nodular, plate-like, spherical, tubular, fibrous, branched, and so forth. The shape (or morphology) of filler materials in the form of particles may vary depending upon the specific application. For example, generally spherical morphologies (such as solid beads, microbeads, or hollow spheres), can be used, as well as particles that are cubic, platy, acicular (elongated or fibrous) or lamellar. Additionally, the filler particles and/or discrete domains may have an internal structure that is hollow, porous and/or void free; e.g., a hollow center with porous or solid walls, and so forth.

The size of the filler material particles and/or discrete domains may be controlled to optimize performance for a particular application. Filler materials of a particular size may be formed by any of a number of various methods known in the art, including pulverizing and classifying dry particulate material, crystallization, precipitation, gas phase condensation, chemical attrition, etc. As an example, bulk filler materials may be milled with milling media to a micro-scale and/or nano-scale size in the presence of a solvent (water and/or an organic solvent) and optionally in the presence of a polymeric grind resin and/or a dispersant. Either hydrophobic or hydrophilic dispersants can be used depending on the particular filler material.

In some embodiments, prior to drawing, an organic filler material and/or an inorganic filler material may be dispersed in the polymeric matrix as particles and/or discrete domains that have a micro-scale size characterized by an average cross-sectional dimension from 1 µm to 2000 µm, such as from 5 µm to 1000 µm, such as from 10 µm to 500 µm, such as from 50 µm to 500 µm. The average cross-sectional dimension may be greater than 1 µm, such as greater than 10 µm, such as greater than 25 µm, such as greater than 50 µm, such as greater than 100 µm, such as greater than 200 µm, such as greater than 300 µm, such as greater than 700 µm, such as greater than 1100 µm, such as greater than 1600 µm, such as greater than 1800 µm. The average cross-sectional dimension of such micro-scale particles and/or discrete domains may be 2000 µm or less, such as 1800 µm or less, such as 1500 µm or less, such as 1200 µm or less, such as 900 µm or less, such as 600 µm or less, such as 300 µm or less, such as 100 µm or less, such as 75 µm or less, such as 45 µm or less, such as 15 µm or less, such as 5 µm or less.

Additionally, or in the alternative, in some embodiments, prior to drawing, an organic filler material and/or an inorganic filler material may be dispersed in the polymeric matrix as particles and/or discrete domains that have a nano-scale size characterized by an average cross-sectional dimension from 1 nm to 1000 nm, such as from 5 nm to 800 nm, such as from 10 nm to 500 nm, such as from 20 nm to 200 nm. The average cross-sectional dimension may be greater than 1 nm, such as greater than 10 nm, such as greater than 25 nm, such as greater than 50 nm, such as greater than 100 nm, such as greater than 200 nm, such as greater than 300 nm, such as greater than 500 nm, such as greater than 700 nm, such as greater than 900 nm. The average cross-sectional dimension of such micro-scale particles and/or discrete domains may be 1000 nm or less, such as 950 nm or less, such as 750 nm or less, such as 550 nm or less, such as 350 nm or less, such as 150 nm or less, such as 90 nm or less, such as 70 nm or less, such as 55 nm or less, such as 35 nm or less, such as 15 nm or less, such as 5 nm or less.

A filler material may be employed in any desired amount, ranging from 0.1 wt. % to 90 wt. % of the thermoplastic composition, such as from 1 wt. % to 90 wt. %, such as from 1 wt. % to 75 wt. %, such as from 5 wt. % to 65 wt. %, such as from 10 wt. % to 60 wt. %, such as from 20 wt. % to 50 wt. %, such as from 30 wt. % to 40 wt. % based on the total weight of the thermoplastic composition. In some embodiments, a filler material may be employed in an amount ranging from 0.1 wt. % to 25 wt. %, such as from 0.5 wt. % to 25 wt. %, such as from 1 wt. % to 25 wt. %, such as from 5 wt. % to 20 wt. %, such as from 10 wt. % to 20 wt. % based on the total weight of the thermoplastic composition. In another embodiment, a filler material may be employed in an amount ranging from 25 wt. % to 75 wt. %, such as from 40 wt. % to 70 wt. %, such as from 50 wt. % to 70 wt. %, such as from 55 wt. % to 65 wt. % based on the total weight of the thermoplastic composition. The filler material may be employed in an amount of at least 1%, such as at least 10%, such as at least 20%, such as at least 30%, such as at least 40%, such as at least 50%, such as at least 60%, such as at least 70%, based on the total weight of the thermoplastic composition. The filler material may be employed in an amount of less than 100%, such as less than 90%, such as less than 80%, such as less than 75%, such as less than 65%, such as less than 60%, such as less than 55%, such as less than 45%, such as less than 40%, such as less than 30%, such as less than 20%, such as less than 10%, such as less than 5%.

In some embodiments, the filler material may include one or more functional groups. Exemplary functional groups include acrylic, amine, amide, nitrile, vinyl (alkene), alkyne, alkyl halide, isocyanate, haloalkane, ester, hydroxyl, epoxy, carboxylic acid, anhydrides, maleic anhydride, sulfur (e.g., thiol, sulfides, disulfides, sulfoxides, sulfones), and organosilane chemical moieties. Such functional groups may impart hydrophobicity to the filler material, which may enhance the moisture barrier properties of the polymeric-film facing material 104. In some embodiments, a functional group may be utilized to provide a surface modification treatment to a filler material. Additionally, or in the alternative, such functional groups may impart reactivity to the filler material, which may enhance adhesion of the polymeric-film facing material 104 to the core material 102.

In some embodiments, a filler material may include any one or more of a number of different kinds of swellable materials. The term "swellable material" refers to an organic or inorganic material, or a combination of organic and/or inorganic materials, that include at least one component that is "water-swellable." By "water-swellable," it is meant that the particles have a capacity to swell when contacted with moisture or water. The term "organic" refers to a natural or synthetic carbon-based compound or material, and the term "inorganic" refers to any compound or material that is not organic. In accordance with the present disclosure, a swellable material may include one or more organic swellable materials and/or inorganic swellable materials. Exemplary swellable materials include organic swellable materials such as swellable polymers and superabsorbent polymers, inorganic swellable materials such as swellable clays, and combinations thereof. Further exemplary swellable materials include composite swellable materials such as superabsorbent particles and coated or encapsulated swellable materials.

Exemplary swellable materials may have a swelling capacity of at least twice the non-swollen volume of the swellable material, as determined by volumetric expansion. For example, in some embodiments, a swellable material may have capability to swell to a volume that is from 2 to 100 times the non-swollen volume of the swellable material, such as from 2 to 50 times the non-swollen volume, such as from 2 to 25 times the non-swollen volume, such as from 2 to 5 times the non-swollen volume, such as from 2 to 10 times the non-swollen volume, such as from 5 to 25 times the non-swollen volume, such as from 10 to 30 times the non-swollen volume, such as from 20 to 50 times the non-swollen volume, such as from 40 to 60 times the non-swollen volume, such as from 50 to 80 times the non-swollen volume of the swellable material. A swellable material may swell to a volume that is at least 2 times the non-swollen volume of the swellable material, such as at least 5 times the non-swollen volume, such as at least 5 times the non-swollen volume, such as at least 10 times the non-swollen volume, such as at least 20 times the non-swollen volume, such as at least 30 times the non-swollen volume, such as at least 40 times the non-swollen volume, such as at least 50 times the non-swollen volume, such as at least 60 times the non-swollen volume, such as at least 80 times the non-swollen volume of the swellable material. A swellable material may swell to a volume that is less than 80 times the non-swollen volume of the swellable material, such as less than 65 times the non-swollen volume, such as less than 55 times the non-swollen volume, such as less than 45 times the non-swollen volume, such as less than 35 times the non-swollen volume, such as less than 25 times the non-swollen volume, such as less than 15 times the non-swollen volume, such as less than 10 times the non-swollen volume, such as less than 5 times the non-swollen volume of the swellable material.

Exemplary swellable materials may additionally or alternatively have capability to absorb an amount of water that exceeds the weight of the swellable material. For example, an exemplary swellable material may have the capacity to absorb from 2 to 30 times its weight in distilled water, such as from 2 to 5 times its weight, such as from 2 to 10 times its weight, such as from 4 to 10 times its weight, such as from 8 to 20 times its weight, such as from 10 to 15 times its weight, such as from 15 to 30 times its weight, such as from 20 to 30 times its weight in distilled water. Exemplary swellable material may have the capacity to absorb at least 2 times its weight in distilled water, such as at least 4 times its weight, such as at least 5 times its weight, such as at least 8 times its weight, such as at least 10 times its weight, such as at least 15 times its weight, such as at least 20 times its weight, such as at least 30 times its weight in distilled water.

The presently disclosed swellable materials may be coated or encapsulated to protect the swellable materials during hydration of the cementitious material, to reduce or prevent expansion during hydration that might negatively affect properties of the cementitious panel, and/or to ensure that these materials maintain effectiveness at the time most needed (i.e. during penetration by fasteners to prevent water infiltration after installation, after long-term exposure, and/or if the panel cracks). Ideally, the swellable materials will not expand during production of the cementitious panels so as to not disrupt the integrity of the interface between the cementitious core and the facing material and/or so as to not reduce the integrity of the core.

The coating material for the swellable materials may dissolve in water over time but remain intact during board hydration and board drying in the kiln. Alternatively, the encasing material could protect the swellable material to prevent swelling during board hydration but slowly dissolve or melt in water at the elevated temperatures, such as at a temperature where the core of the board approaches the boiling point of water during drying in the kiln. An example of such an encapsulating material includes a fully hydrolyzed polyvinyl alcohol. Further, the coating may be formed of materials that are stable through board production but that rupture or break upon exposure to a nail, screw, or other stress.

After exposure and conditioning during board production, the encapsulating material would, optionally, no longer fully protect the swellable material. The swellable material would then be available to expand during water exposure after application in the field. Alternatively, the encapsulating material could remain covering the swellable material and dissolve or rupture after application in the field.

A cementitious panel that contains a swellable material may exhibit "self-healing" properties, such that upon sustaining initial damage of a physical or water-related nature, the swellable material may become activated by a resulting exposure to moisture or water which may cause the swellable material to swell and thereby prevent or reduce the tendency for such moisture or water to penetrate further into the cementitious panel and further damage or deteriorate the panel. For example, when a cementitious panel is punctured by a fastener or sustains other types of damage such as cracks, cuts, perforations, or the like, the swellable material in the facing material may be exposed, and when coming into contact with water or moisture, the exposed swellable material may absorb the water or moisture and thereby expand so as to at least partially block or fill the puncture site in the facing material. Additionally, or in the alternative, excessive exposure to moisture or water may eventually lead to moisture penetrating though the facing material of the panel and into void volumes within the core. Regardless of the cause, moisture or water penetrating the facing material and/or entering such void volumes may interact with and become absorbed by the swellable material, causing the swellable material to swell and thereby prevent or reduce such moisture or water from penetrating further into the cementitious panel. In this way, the swellable material may provide some protection where punctures or other damage might otherwise allow moisture or water to deteriorate or weaken a cementitious panel.

Any of the presently disclosed swellable materials may be utilized to provide cementitious panels with such "self-healing" properties, including coated or encapsulated swellable materials as well as inorganic or organic swellable materials that do not have a coating or encapsulation layer. In the case of coated or encapsulated swellable materials, the "self-healing" properties of the swellable material may become activated by physical damage such as a puncture or crack rupturing the coating or encapsulation layer and thereby exposing the swellable material. Additionally, or in the alternative, the "self-healing" properties may become activated by exposure to a sufficiently high level of moisture or water such that the coating or encapsulation layer dissolves. In this way, a desirable level of moisture may be allowed to pass through the facing material, such as to allow the panel to exhibit good breathability, without activating the "self-healing" properties of the swellable material unless or until the coating or encapsulation layer ruptures or dissolves. A balance between good breathability and "self-healing" properties may be achieved by carefully controlling the composition of the swellable material and the coating or encapsulation layer thereof, as well as by carefully controlling the location and concentration of the swellable material within the facing material.

In some embodiments, a swellable material contained within a coating or encapsulation layer may include a swellable material in the form of a fluid or a swellable material dispersed in a fluid. For example, an organic swellable material such as a swellable polymer or a superabsorbent polymer in the form of a fluid may be contained within a coating or encapsulation layer. As another example, such an organic swellable material and/or an inorganic swellable material such as a swellable clay may be dispersed in a fluid which may be contained within a coating or encapsulation layer. When a coating or encapsulation layer ruptures or dissolves, such a fluid (i.e., a swellable material in the form of a fluid or dispersed in a fluid) may flow to other areas where the swellable material may then swell and thereby prevent or reduce the tendency for such moisture or water to penetrate further into the cementitious panel and further damage or deteriorate the panel.

A swellable material in the form of a fluid or dispersed in a fluid may flow by way of capillary action and/or diffusion. In some embodiments, a swellable material may flow through punctures, cracks, cuts, perforations, or the like by way of capillary action. In this way, the swellable material may flow into other areas of such a puncture, crack, cut, perforation, or the like so as to provide "self-healing" properties at locations beyond the original location of the coated or encapsulated swellable material. Such flowability of a swellable material combined with its swelling capacity may allow a swellable material to encompass a large area of damage, regardless of the location within the area of damage where the coated or encapsulated swellable material may have been initially located. Additionally, or in the alternative, a swellable material in the form of a fluid or dispersed in a fluid may flow through water or moisture by way of diffusion. In some embodiments, such flowability of a swellable material may allow a swellable material to flow through water or moisture by way of diffusion to areas where the swellable material is needed most, regardless of the particular location within the area of damage where the coated or encapsulated swellable material may have been initially located.

In the case of swellable materials that do not have a coating or encapsulation layer, "self-healing" properties may be provided by selectively locating swellable material having suitable moisture absorption properties within the facing material, such that the swellable material may become activated by exposure to a sufficiently high level of moisture or water and thereby prevent or reduce further penetration into the cementitious panel, while still allowing for good breathability. For example, in some embodiments the swellable material may be located on the inward side of the facing material, which may not typically become exposed to sufficiently high levels of moisture or water except when the facing material has sustained some initial physical or water-related damage. Additionally, or in the alternative, swellable material located on or within the facing material may be present in the form of a porous film, and as such, the swellable material may incrementally fill or block such pores with increasing exposure to moisture or water. In this way, the breathability of the panel may be retained even with some initial swelling partially blocking the pores, while at the same time the swellable material may prevent or mitigate higher levels of moisture from crossing such film and migrating to other portions of the panel.

a. Organic Filler Materials

Suitable organic filler materials include thermoset materials, thermoplastic materials, and combinations of these. The organic filler material takes the form of a solid, which may be amorphous, crystalline, or semi-crystalline. Suitable thermoset materials include, for example, aminoplasts, epoxy materials, phenolics, thermoset polyesters, thermoset polyurethanes, vinyl esters, and combinations of any of the foregoing. Suitable thermoplastic materials include, for example, thermoplastic polyesters such as polyethylene terephthalate, polybutylene terephthalate and polyethylene naphthalate, polycarbonates, polyolefins such as polyethylene, polypropylene and polyisobutene, acrylic polymers such as copolymers of styrene and an acrylic acid monomer, and polymers containing methacrylate, polyamides, thermoplastic polyurethanes, vinyl polymers, and combinations of any of the foregoing.

An organic filler material may be selected so as to be at least partially incompatible with the one or more matrix polymers so that the filler material can be distributed throughout the polymeric matrix in the form of discrete domains. Such partial incompatibility can be accomplished in a variety of ways. In some embodiments, the organic filler material may possess a nonpolar component (e.g., olefin) that is compatible with the one or more matrix polymers and allows it to become uniformly distributed throughout the polymeric matrix. Nevertheless, the organic filler material may also include a polar component that is incompatible with the one or more matrix polymers, thereby allowing it to coalesce or segregate into discrete domains throughout the polymeric matrix. Such a component may include charged or uncharged polar domains, ionic groups, low or high molecular weight polar molecular segments or blocks, and/or polar molecular groups. Alternatively, the organic filler material may be entirely nonpolar in nature but possess certain physical properties that still allow for discrete domains to be formed. For example, the organic filler material may be compatible or miscible with the one or more matrix polymers above a certain temperature, but phase separate at temperatures lower than the critical solution temperature. The organic filler material can thereby form a stable blend with the one or more matrix polymers in the melt phase, but as the temperature decreases, the continuous phase crystallizes and segregates so that the organic filler material can phase separate, coalesce, and form discrete domains.

In certain embodiments of the present invention, multiple organic filler materials may be employed in combination. For instance, a first organic filler material (e.g., polyepoxide) may be dispersed in the form of domains having an average cross-sectional dimension from about 50 to about 500 nanometers, in some embodiments from about 60 to about 400 nanometers, and in some embodiments from about 80 to about 300 nanometers. A second organic filler material may also be dispersed in the form of domains that are smaller than the first organic filler material, such as those having an average cross-sectional dimension from about 1 to less than about 50 nanometers, in some embodiments from about 2 to about 45 nanometers, and in some embodiments from about 5 to about 40 nanometers. When employed, the first and/or second organic filler materials typically constitute from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the first and/or second organic filler materials in the entire thermoplastic composition may likewise be from about 0.01 wt. % to about 15 wt. %, in some embodiments from about 0.05 wt. % to about 10 wt. %, and in some embodiments, from about 0.1 wt. % to about 8 wt. % of the thermoplastic composition.

The particular state or form of the organic filler material is not critical, provided that desired domains can be formed within the polymeric matrix. Typically, the organic filler material takes the form of a solid, which may be amorphous, crystalline, or semi-crystalline. One example of such a filler material is a microcrystalline polyolefin wax, which is typically derived from ethylene and/or C3-C10-alkenes, such as from propylene, butene, pentene, hexene, heptene, octene, nonene, and decene. Microcrystalline waxes typically have a relatively low melting temperature, such as from about 30° C. to about 150° C., in some embodiments from about 50° C. to about 140° C., and in some embodiments, from about 80° C. to about 130° C. At such low melting temperatures, the wax can form a miscible blend with the polymeric matrix when in the melt phase, but as the temperature decreases and polymer crystalizes or solidifies, the wax will segregate and coalesce forming separate nano-scale domains.

Alternatively, in some embodiments, the organic filler material can be in the form of a liquid or semi-solid at room temperature (e.g., 25° C.). Such a liquid can be readily dispersed in the polymeric matrix to form a metastable dispersion and then quenched to preserve the domain size by reducing the temperature of the blend. The kinematic viscosity of such a liquid or semi-solid material is typically from about 0.7 to about 200 centistokes ("cs"), in some embodiments from about 1 to about 100 cs, and in some embodiments, from about 1.5 to about 80 cs, determined at 40° C. Suitable liquids or semi-solids include silicones, silanes (e.g., vinyl-functional silanes), siliconates (e.g., potassium methyl siliconate), silicone-polyether copolymers, aliphatic polyesters, aromatic polyesters, alkylene glycols (e.g., ethylene glycol, diethylene glycol, triethylene glycol, tetraethylene glycol, propylene glycol, polyethylene glycol, polypropylene glycol, polybutylene glycol, etc.), alkane diols (e.g., 1,3-propanediol, 2,2-dimethyl-1,3-propanediol, 1,3-butanediol, 1,4-butanediol, 1,5-pentanediol, 1,6-hexanediol, 2,2,4-trimethyl-1,6 hexanediol, 1,3-cyclohexanedimethanol, 1,4-cyclohexanedimethanol, 2,2,4,4-tetramethyl-1,3-cyclobutanediol, etc.), amine oxides (e.g., octyldimethylamine oxide), fatty acid esters, fatty acid amides (e.g., oleamide, erucamide, stearamide, ethylene bis(stearamide), etc.), mineral, and vegetable oils, and so forth. One particularly suitable liquid or semi-solid is polyether polyol, such as commercially available under the trade name PLURIOL® WI from BASF Corp.

Particularly suitable organic filler materials include polyesters that are generally rigid in nature to the extent that they have a relatively high glass transition temperature. For example, the glass transition temperature ("Tg") may be about 0° C. or more, in some embodiments from about 5° C. to about 100° C., in some embodiments from about 30° C. to about 80° C. and in some embodiments, from about 50° C. to about 75° C. The glass transition temperature may be determined by dynamic mechanical analysis in accordance with ASTM E1640-09. Exemplary rigid polyesters include polylactic acid and/or polylactic acid copolymers. Polylactic acid may generally be derived from monomer units of any isomer of lactic acid, such as levorotory-lactic acid ("L- lactic acid"), dextrorotatory-lactic acid ("D-lactic acid"), meso-lactic acid, or mixtures thereof. Monomer units may also be formed from anhydrides of any isomer of lactic acid. Any known polymerization method, such as polycondensation or ring-opening polymerization may be used to polymerize lactic acid.

Yet another example of an organic filler material is a functionalized polyolefin that contains a polar and nonpolar component. The polar component may, for example, be provided by one or more functional groups and the nonpolar component may be provided by an olefin. The olefin component of the organic filler material may generally be formed from any linear or branched α-olefin monomer, oligomer, or polymer (including copolymers) derived from an olefin monomer. The functional group of the organic filler material may be any group, molecular segment and/or block that provides a polar component to the molecule and is not compatible with the one or more matrix polymers. Examples of molecular segment and/or blocks not compatible with polyolefin may include acrylates, styrenics, polyesters, polyamides, and so forth. The functional group may include charged metal ions and may exhibit an ionic nature.

Particularly suitable functional groups include maleic anhydride, maleic acid, fumaric acid, malemide, maleic acid hydrazide, a reaction product of maleic anhydride and diamine, methylnadic anhydride, dichloromaleic anhydride, maleic acid amide, etc. Maleic anhydride modified polyolefins may be particularly suitable. Such modified polyolefins are typically formed by grafting maleic anhydride onto a polymeric backbone material.

In some embodiments, the organic filler material may be reactive. One example of such a reactive organic filler material is a polyepoxide that contains, on average, at least two oxirane rings per molecule. Without intending to be limited by theory, it is believed that a cementitious panel 100 may exhibit enhanced bonding between the core material 102 and a polymeric-film facing material 104, when the matrix polymer of the polymeric-film includes such polyepoxide molecules. That is, it is believed that such polyepoxide molecules can improve bonding between the facing material 104 and the core material 102 by reacting with certain components of the core material 102. For example, the polyepoxide molecules may undergo reactions such as chain extension, side chain branching, grafting, copolymer formation, and so forth with components of the core material 102.

For example, as will be described in more detail below, the core material of cementitious panels typically includes a core adhesive, which bonds the core material 102 and the facing material 104 together. Such core adhesive typically includes a starch material and/or a resinous binder such as a polyester resin, although other materials may additionally or alternatively be included. As another example, the core material 102 may include natural fibers such as cellulosic fibers, glass fibers, and/or synthetic fibers such as polyester. Such fibers are typically included for the purpose of providing reinforcement and core integrity. Such fibers may be in the form of whiskers or filaments. Exemplary cellulosic fibers include ultrafine cellulose, nanocrystalline cellulose, and microcrystalline cellulose. In embodiment such as these, the reactive organic filler material may enable nucleophilic ring-opening reactions with the core adhesive, for example, via a carboxyl terminal group (esterification) or via a hydroxyl group (etherification). Oxazoline side reactions may likewise occur to form esteramide moieties. Through reactions such as these, the organic filler material may become bonded with core adhesives and/or fibers of the core material 102.

Another type of organic filler material includes organic pigments. In one embodiment, the filler material includes an organic pigment. Example organic pigments include azo compounds, heterocyclic pigments, bicyclic pigments, and polycyclic pigments. Azo compounds generally refer to aryl and alkyl derivatives of diazene. Exemplary azo compounds include azobenzene, diphenyldiazene, benzimidazolone, and azobisisobutyronitrile. Exemplary heterocyclic pigments include isoindoline. Exemplary bicyclic pigment includes diketopyrrolopyrrole (e.g., 1,4-diketopyrrolopyrrole). Exemplary polycyclic pigments include phthalocyanine, quinacridone, perylene, perinone, diketopyrrolo pyrrole, thioindigo, anthraquinone indanthrone, anthrapyrimidine, flavanthrone, pyranthrone, anthanthrone, dioxazine e.g., triphenedioxazine), triarylcarbonium, and quinophthalone, as well as combinations of any of the foregoing. In one embodiment, the organic pigment is selected from quinacridone, phthalocyanine, isoindoline, dioxazine, diketopyrrolopyrrole, anthrapyrimidine, anthanthrone, flavanthrone, indanthrone, perinone, pyranthrone, thioindigo, as well as substituted derivatives of any of the foregoing, and combinations of any of the foregoing.

Any of the organic pigments can be unsubstituted or substituted and if substituted may contain any number of substituents. Substituted perylenes may be substituted at imide nitrogen atoms for example, and substituents may include alkyl groups having 1 to 10 carbon atoms, alkoxy groups having 1 to 10 carbon atoms and/or halogens. Dimides and dianhydrides of perylene-3,4,9,10-tetracarbbxylic acid may be particularly suitable. Phthalocyanine pigments and/or quinacridone pigments may be partially substituted, for example, with one or more alkyl groups having 1 to 10 carbon atoms, alkoxy groups having 1 to 10 carbon atoms, halogens, and/or other substituents typical of phthalocyanine pigments.

1. Superabsorbent Polymers

Another type of organic filler material includes superabsorbent polymers, which generally refers to polymers that are water-swellable, water insoluble materials capable of absorbing several times their weight in water. An exemplary superabsorbent polymer may be capable of absorbing at least 10 times its weight in water, such as at least 50 times its weight in water, such as at least 100 times its weight in water, such as at least 300 times its weight in water. Superabsorbent polymers are generally formed from a three-dimensional crosslinked polymer network that contains repeating units derived from one or more ethylenically (e.g., monoethylenically) unsaturated monomeric compounds having at least one hydrophilic radical, such as a carboxyl, carboxylic acid anhydride, carboxylic acid salt, sulfonic acid, sulfonic acid salt, hydroxyl, ether, amide, amino, or quaternary ammonium salt group. These monomeric compounds can be selected, for example, from ethylenically unsaturated carboxylic acids and acid anhydrides, ethylenically unsaturated sulfonic acids, and mixtures thereof.

In some embodiments, a polymeric-film facing material includes a superabsorbent polymer that includes an ethylenically unsaturated carboxylic acid monomeric compound. Suitable ethylenically unsaturated carboxylic acid and carboxylic acid anhydride monomeric compounds for forming superabsorbent polymers include, for example, acrylic acid, methacrylic acid, ethacrylic acid, α-chloroacrylic acid, α-cyanoacrylic acid, crotonic acid (β-methylacrylic acid), α-phenylacrylic acid, β-acryloxy-propionic acid, sorbic acid, α-chlorosorbic acid, angelic acid, cinnamic acid, β-chlorocinnamic acid, β-stearylacrylic acid, itaconic acid, monoalkyl esters of itaconic acid, citraconic acid, mesaconic acid, glutaconic acid, aconitic acid, maleic acid, monoalkyl esters of maleic acid, furmaric acid, monoalkyl esters of fumaric acid, dialkyl esters of maleic and fumaric acids, tricarboxyethylene, and maleic anhydride. Additionally, suitable carboxylic acid monomeric compounds include salts of carboxylic acids, such as alkali metal salts, ammonium salts, amine salts, and so forth. Such salts of carboxylic acids include, for example, sodium (meth)acrylate, trimethylamine(meth)acrylate, triethanolamine-(meth)acrylate, sodium maleate, methylamine maleate, and so forth.

In some embodiments, a polymeric-film facing material includes a superabsorbent polymer that includes an ethylenically unsaturated sulfonic acid monomeric compound. Suitable ethylenically unsaturated sulfonic acid monomeric compounds for forming superabsorbent polymers include, for example, aliphatic or aromatic vinyl sulfonic acids and salts of vinyl sulfonic acids; acrylic or methacrylic sulfonic acids and salts of methacrylic sulfonic acids; and combinations of any of the foregoing. Exemplary aliphatic or aromatic vinyl sulfonic acids include vinylsulfonic acid, allyl sulfonic acid, vinyl toluene sulfonic acid, and styrene sulfonic acid. Exemplary acrylic and methacrylic sulfonic acids include sulfoethyl acrylate, sulfoethyl methacrylate, sulfopropyl acrylate, sulfopropyl methacrylate, 2-hydroxy-3-methacryloxypropyl sulfonic acid, and 2-acrylamide-2-methylpropane sulfonic acid, and so forth.

Methacrylic acid monomeric compounds may be particularly suitable. In some embodiments, a polymeric-film facing material includes a superabsorbent polymer that includes a methacrylic acid monomeric compound. Some examples of suitable ethylenically unsaturated methacrylic acid monomeric compounds include alkyl esters of (meth)acrylic acids, such as ethyl (meth)acrylate, methyl (meth)acrylate, butyl (meth)acrylate, 2-ethylhexyl (meth)acrylate, 2-hydroxyethyl (meth)acrylate, hydroxypropyl (meth)acrylate, hydroxy butyl (meth)acrylate, isobornyl (meth)acrylate, lauryl (meth)acrylate, and ethylene glycol di(meth)acrylate, and so forth.

In some embodiments, ethylenically unsaturated monomeric compounds may include an ethylenically unsaturated beta-hydroxy ester functional monomer and an epoxy compound such as a glycidyl ethers and/or glycidyl esters. Suitable epoxy compounds include those having the following structure:

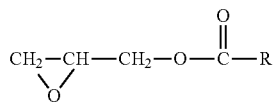

wherein R is a hydrocarbon radical containing from 4 to 26 carbon atoms. Suitable glycidyl esters include those commercially available from Exxon Chemical Company under the designation GLYDEXX-10, or from Shell Chemical Company under the designation CARDURA E.

The ethylenically unsaturated monomeric compound(s) are typically polymerized in the presence of a crosslinking agent to provide a crosslinked polymer. Suitable crosslinking agents typically possess two or more groups that are capable of reacting with the ethylenically unsaturated monomeric compound and that are at least partially water soluble or water dispersible, or at least partially soluble or dispers-ible in an aqueous monomer mixture. Examples of suitable crosslinking agents may include, for instance, tetraallyloxyethane, N,N'-methylene bisacrylamide, N,N'-methylene bismethacrylamide, triallylamine, trimethylol propane triacrylate, glycerol propoxy triacrylate, divinylbenzene, N-methylol acrylamide, N-methylol methacrylamide, glycidyl methacrylate, polyethylene polyamines, ethyl diamine, ethyl glycol, glycerin, tetraallyloxyethane and triallyl ethers of pentaerythritol, aluminates, silica, alumosilicates, etc., as well as combinations thereof. The amount of the crosslinking agent may vary but is typically present in an amount from about 0.005 to about 1.0 mole percent based on moles of the ethylenically unsaturated monomeric compound(s).

In the embodiments described above, crosslinking generally occurs during polymerization. In other embodiments, however, the polymer may contain a latent functional group that is capable of becoming crosslinked when desired. For instance, the polymer may contain an alkoxysilane functional group which, upon exposure to water, forms a silanol functional group that condenses to form a crosslinked polymer. One particular example of such a functional group is a trialkoxysilane having the following general structure:

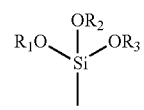

wherein $R_1$, $R_2$ and $R_3$ are alkyl groups independently having from 1 to 6 carbon atoms. To introduce such a functional group into the polymer structure, a monomeric compound may be employed that contains the functional group, such as an ethylenically unsaturated monomer containing a trialkoxysilane functional group.

b. Inorganic Filler Materials

Suitable inorganic filler materials include siliceous particles, as well as particles of aluminum oxides, titanium oxides (e.g., titanium dioxide), zinc oxides, antimony oxides, zirconia, magnesia, zinc sulfide, barium sulfate, strontium sulfate, cesium oxide, yttrium oxide, colloidal yttria, zirconia, colloidal zirconia, calcium carbonate, and/or magnesium carbonate. Additional suitable inorganic filler materials include aluminum hydroxide (ATH), magnesium hydroxide (MDH), refractory fibers (e.g. alumina or zirconia), magnesium phosphate pentahydrate, magnesium sulfate heptahydrate, zinc borate, magnesium carbonate basic pentahydrate, hydromagnesite, sodium borate decahydrate, perlite, intumescents, and melamine polymers.

In some embodiments, siliceous particles are particularly suitable. Examples of suitable siliceous particles include particles of crystalline or amorphous phyllosilicates and micaceous minerals, including fumed silica, amorphous silica, colloidal silica, and surface-modified silica. Suitable phyllosilicates include, for example, beidelite, hectorite, kenyaite, laponite, magadite, medmontite, montmorillonite, nontronite, phlogopite, saponite, sauconite, smectite, stevensite, vermiculite, and volkonskoite, as well as combinations of any of the foregoing. Smectite and vermiculite are particularly suitable. Suitable smectite particles include montmorillonite (often referred to as bentonite), beidelite, nontronite, hectorite, saponite, sobockite; svinfordite; sauconite, and laponite, as well as montmorillonite salts, such as sodium montmorillonite, magnesium montmorillonite, calcium montmorillonite, and so forth.

Further suitable phyllosilicates include kaolin minerals (including kaolinite, dickite, and hacrite); micaceous minerals (e.g., illite) and mixed illite/smectite minerals, such as rectorite, tarosovite, ledikite and admixtures of illites with the phyllosilicates named above; serpentine minerals, chlorite minerals, sepolite, palygorskite, and bauxite, as well as combinations of any of the foregoing. Additional suitable siliceous materials include talc, gypsum, calcite, diatomaceous earth, natural and synthetic zeolites, cement, calcium silicate, sodium aluminum silicates (e.g., nonzeolite silicates), aluminum polysilicate, magnesium silicates, wollastonite, alumina silica gels, glass particles, pumice, tuff, and the like. Of the silicas, precipitated silica, silica gel, or fumed silica may be particularly suitable. In addition, the silica may be a surface-modified silica.

Suitable inorganic filler materials additionally include metal nanoparticles or fibers, such as molybdenum, platinum, palladium, nickel, aluminum, copper, gold, iron, silver, alloys of any of the foregoing, as well as combinations or mixtures of any of the foregoing. In some embodiments, an inorganic filler material may include metal fibers, such as aluminum, copper, or steel metal fibers. Exemplary aluminum particles include alumina, colloidal alumina, fumed alumina, and calcined alumina. Further suitable inorganic filler materials include graphite; ceramic materials; carbides; nitrides, such as boron nitride; borides; sulfides, such as molybdenum disulfide, tantalum disulfide, tungsten disulfide, silver sulfide, and zinc sulfide; as well as combinations of any of the foregoing.

Another type of inorganic filler material includes an inorganic polymeric filler material. In one embodiment, the inorganic filler material may be an inorganic polymeric filler material. Inorganic polymeric filler materials include polymeric materials that have a backbone chain with a repeating unit based on an element other than carbon, such as Al, B, Fe, Ge, N, O, P, S, Si, Sn, as well as combinations of these, such as combinations of N and P, Si and O, S and N, Fe and Si, Al and O, and so forth. Inorganic polymeric filler materials may include homopolymers, copolymers, random copolymers, block copolymers, graft copolymers, atactic polymers, isotactic polymers, syndiotactic polymers, linear polymers, and/or branched polymers. When mixtures of polymers are used, the mixture may be homogeneous, or the mixture may include two or more polymeric phases. As examples, suitable inorganic polymeric filler materials include polyphosphazenes, polysilanes, polysiloxanes, polygermanes, polymeric sulfur, polymeric selenium, silicones, aluminum-containing polymers (e.g., poly(acyloxyaloxane), poly(aluminoxane)), ferrocene-containing polymers (e.g., poly(ferrocenylsilanes)), as well as combinations of any of the foregoing.

Another type of inorganic filler material includes inorganic pigments. In one embodiment, the filler material includes an inorganic pigment. Example inorganic pigments include aluminum-containing pigments (e.g., zeolite-based minerals), antimony-containing pigments (e.g., antimony (III) oxide), arsenic-containing pigments (e.g., realgar), barium-containing pigments (e.g., barium sulfate), bismuth-containing pigments, cadmium-containing pigments (e.g., cadmium sulfide), carbon-containing pigments (e.g., carbon black), chromium-containing pigments (e.g., chromium(III) oxide, lead(II) chromate), cobalt-containing pigments (e.g., cobalt phosphate, cobalt(II) oxide-aluminum oxide, cobalt (II) aluminate), copper-containing pigments (e.g., barium-copper-silicates, calcium copper silicate, azurite), iron-containing pigments (e.g., ochre, lead antimonate), lead-containing pigments (e.g., minium, lead(II) carbonate), manganese-containing pigments (e.g., YInMn, manganese (IV) oxide), mercury-containing pigments (e.g., mercuric sulfides), silica-containing pigments, tin-containing pigments (e.g., tin(IV) sulfide), titanium-containing pigments (e.g., titanium(III) oxide, titanium(IV) oxide), and zinc-containing pigments (e.g., zinc chromate, zinc oxide).

1. Inorganic Filler Materials with Organic Surface Treatments

The inorganic filler material may also contain an organic surface treatment that enhances the hydrophobicity of the filler material. Such an enhanced hydrophobicity may improve bonding between the filler material of the polymeric-film facing material 104 and the core material 102 and/or may prevent expansion of the filler material during formation of the cementitious panels. Additionally, the enhanced hydrophobicity may improve compatibility of the inorganic filler material with the matrix polymer. In one embodiment, the organic surface treatment may be formed from a quaternary onium (e.g., salt or ion). In the case of filler materials with a layered structure, the organic surface treatment may become intercalated via ion-exchange into the interlayer spaces between adjacent layers of filler material. The quaternary onium ion may have the following structure:

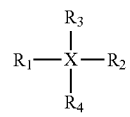

wherein

X is N, P, S, or O; and $R_1$, $R_2$, $R_3$ and $R_4$ are independently hydrogen or organic moieties, such as linear or branched alkyl, aryl or aralkyl moieties having 1 to about 24 carbon atoms.

Particularly suitable quaternary ammonium ions are those having the structure below:

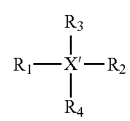

wherein $R_1$ is a long chain alkyl moiety ranging from $C_6$ to $C_{24}$, straight or branched chain, including mixtures of long chain moieties, such as $C_6$, $C_8$, $C_{10}$, $C_{12}$, $C_{14}$, $C_{16}$, $C_{18}$, $C_{20}$, $C_{22}$ and $C_{24}$, alone or in any combination; and $R_2$, $R_3$ and $R_4$ are moieties, which may be the same or different, selected from the group consisting of H, alkyl, hydroxyalkyl, benzyl, substituted benzyl, e.g., straight or branched chain alkyl-substituted and halogen-substituted; ethoxylated or propoxylated alkyl; ethoxylated or propoxylated benzyl (e.g., 1-10 moles of ethoxylation or 1-10 moles of propoxylation).

Additional useful multi-charged spacing/coupling agents include for example, tetra-, tri-, and di-onium species such as tetra-ammonium, tri-ammonium, and di-ammonium (primary, secondary, tertiary, and quaternary), -phosphonium, -oxonium, or -sulfonium derivatives of aliphatic, aromatic or arylaliphatic amines, phosphines, esters, alcohols and sulfides. Illustrative of such materials are di-onium compounds of the formula:

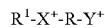

wherein

X+ and Y+, are the same or different and are ammonium, sulfonium, phosphonium, or oxonium radicals such as —NH(CH$_3$)$_2^+$, —NH$_2$(CH$_3$)$^+$, —N(CH$_3$)$_3$$^+$, —N(CH$_3$)$_2$(CH$_2$CH$_3$)$^+$, —N(CH$_3$)(CH$_2$CH$_3$)$_2$$^+$, —S(CH$_3$)$_2$$^+$, —S(CH$_3$)$_2^+$, —P(CH$_3$)$_3^+$, —NH$_3^+$, etc.;

R is an organic spacing, backbone radical, straight or branched, such as those having from 2 to 24 carbon atoms, and in some embodiments from 3 to 10 carbon atoms, in a backbone organic spacing molecule covalently bonded at its ends to charged N$^+$, P$^+$, S$^+$and/or O$^+$cations; and R$^1$ can be hydrogen, or a linear or branched alkyl radical of 1 to 22 carbon atoms, linear or branched, and in some embodiments, 6 to 22 carbon atoms.

Exemplary R groups are alkyls (e.g., methyl, ethyl, butyl, octyl, etc.); aryl (e.g., benzyl, phenylalkyl, etc.); alkylenes (e.g., methylene, ethylene, octylene, nonylene, tert-butylene, neopentylene, isopropylene, sec-butylene, dodecylene, etc.); alkenylenes (e.g., 1-propenylene, 1-butenylene, 1-pentenylene, 1-hexenylene, 1-heptenylene, 1-octenylene, etc.); cycloalkenylenes (e.g., cyclohexenylene, cyclopentenylene, etc.); hydroxyalkyl (e.g. hydroxymethyl, hydroxyethyl, hydroxyl-n-propyl, hydroxyisopropyl, hydroxyl-n-butyl, hydroxyl-iso-butyl, hydroxyl-tert-butyl, etc.), alkanoylalkylenes (e.g., butanoyl octadecylene, pentanoyl nonadecylene, octanoyl pentadecylene, ethanoyl undecylene, propanoyl hexadecylene, etc.); alkylaminoalkylenes (e.g., methylamino octadecylene, ethylamino pentadecylene, butylamino nonadecylene, etc.); dialkylaminoalkylene (e.g., dimethylamino octadecylene, methylethylamino nonadecylene, etc.); arylaminoalkylenes (e.g., phenylamino octadecylene, p-methylphenylamino nonadecylene, etc.); diarylaminoalkylenes (e.g., diphenylamino pentadecylene, p-nitrophenyl-p'-methylphenylamino octadecylene, etc.); alkylarylaminoalkylenes (e.g., 2-phenyl-4-methylamino pentadecylene, etc.); alkylsulfinylenes, alkylsulfonylenes, alkylthio, arylthio, arylsulfinylenes, and arylsulfonylenes (e.g., butylthio octadecylene, neopentylthio pentadecylene, methyl sulfinylnonadecylene, benzylsulfinyl pentadecylene, phenylsulfinyl octadecylene, propylthiooctadecylene, octylthio pentadecylene, nonylsulfonyl nonadecylene, octylsulfonyl hexadecylene, methylthio nonadecylene, isopropylthio octadecylene, phenylsulfonyl pentadecylene, methylsulfonyl nonadecylene, nonylthio pentadecylene, phenylthio octadecylene, ethyltio nonadecylene, benzylthio undecylene, phenethylthio pentadecylene, sec-butylthio octadecylene, naphthylthio undecylene, etc.); alkoxycarbonylalkylenes (e.g., methoxycarbonylene, ethoxycarbonylene, butoxycarbonylene, etc.); cycloalkylenes (e.g., cyclohexylene, cyclopentylene, cyclooctylene, cycloheptylene, etc.); alkoxyalkylenes (e.g., methoxymethylene, ethoxymethylene, butoxymethylene, propoxyethylene, pentoxybutylene, etc.); aryloxyalkylenes and aryloxyarylenes (e.g., phenoxyphenylene, phenoxymethylene, etc.); aryloryalkylenes (e.g., phenoxydecylene, phenoxyoctylene, etc.); alylalkylenes (e,g., benzylene, phenthylene, 8-phenyloctylene, 10-phenyldecylene, etc.); alkylarylenes (e.g., 3-decylphenylene, 4-octylphenylene, 4-nonylphenylene, etc.); and polypropylene glycol and polyethylene glycol substituents (e.g., ethylene, propylene, butylene, phenylene, benzylene, tolylene, p-styrylene, p-phenylmethylene, octylene, dodecylene, octadecylene, methoxyethylene, etc.), as well as combinations thereof. Such tetra-, tri-, and di-ammonium, -sulfonium, -phosphonium, -oxonium; ammonium/sulfonium; ammonium/phosphonium; ammonium/oxonium; phosphonium/oxonium; sulfonium/oxonium; and sulfonium/phosphonium radicals are well known in the art and can be derived from the corresponding amines, phosphines, alcohols or ethers, and sulfides.

Particularly suitable multi-charged spacing/coupling agent compounds are multi-onium compounds that include at least two primary, secondary, tertiary or quaternary ammonium, phosphonium, sulfonium, and/or oxonium ions having the following general formula:

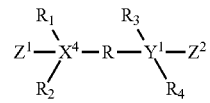

wherein

R is an alkylene, aralkylene or substituted alkylene charged atom spacing moiety; and Z$_1$, Z$_2$, R$_1$, R$_2$, R3, and R$_4$ may be the same or different and selected from the group consisting of hydrogen, alkyl, aralkyl, benzyl, substituted benzyl (e.g., e.g., straight or branched chain alkyl-substituted and halogen-substituted); ethoxylated or propoxylated alkyl; ethoxylated or propoxylated benzyl (e.g., 1-10 moles of ethoxylation or 1-10 moles of propoxylation).

Particularly suitable organic cations may include, for instance, quaternary ammonium compounds, such as dimethyl bis[hydrogenated tallow] ammonium chloride (2M2HT), methyl benzyl bis[hydrogenated tallow] ammonium chloride (MB2HT), methyl tris[hydrogenated tallow alkyl] chloride (M3HT), etc. An example of a suitable inorganic filler material is Nanomer™ 1.44P, which is a quaternary ammonium modified montmorillonite and commercially available from Nanocor, Inc. Other suitable inorganic filler materials include those available from Southern Clay Products, such as Cloisite™ 15A, Cloisite™ 30B, Cloisite™ 93 A, and Cloisite™ Na$^+$.

c. Fibrous Filler Materials

In some embodiments, a polymeric-film facing material may include a fibrous filler material. The fibrous filler material may be located at an inner side (i.e., the core-facing side) of the polymeric-film facing material. The fibrous filler material may impart a textured surface that may enhance bonding between the polymeric-film facing material and the core material. The textured surface may include hooks, fibrils, hairs, or the like, which may help adhere the polymeric-film facing material to the core layer through physical/mechanical and/or chemical interaction. As the polymeric-film facing material and a slurry of core material or dense layer come into contact with one another, the texture surface of the fibrous filler material may become surrounded or embedded in the slurry material.

Exemplary fibrous filler materials include cellulosic fibers, glass fibers, and/or synthetic fibers such as polyester. Such fibers may be in the form of whiskers or filaments. Such fibers may be obtained from recycled sources, including recycled paper or paperboard products, recycled fiberglass, recycled carpet fibers, and so forth.

Composite Filler Materials a. Superabsorbent Particles

Superabsorbent particles include both superabsorbent polymers as discussed above, and complexes or mixtures of superabsorbent polymers with inorganic particles such the inorganic filler materials described herein. Similar to the superabsorbent polymers discussed above, superabsorbent particles formed of complexes or mixtures of superabsorbent polymers with inorganic filler materials are water-swellable, water insoluble materials capable of absorbing several times their weight in water. An exemplary superabsorbent particle may be capable of absorbing at least 10 times its weight in water, such as at least 50 times its weight in water, such as at least 100 times its weight in water, such as at least 300 times its weight in water.

The water-swellable properties of the superabsorbent particles are reversible. That is, when in contact with water or moisture the superabsorbent particles may swell as water or moisture is absorbed into the porous structure of the particles, and then the particles may contract back to their original size as absorbed water or moisture dissipates into the atmosphere from the porous structure of the particles when no longer in contact with water or moisture. When included in a polymeric-film, superabsorbent particles may enhance the water impermeability of the polymeric-film, for example, by initially absorbing some water, causing the superabsorbent particle to swell and at least partially block the network of interconnected pores throughout the polymeric matrix of the polymeric-film and/or the porous structure of the superabsorbent particles themselves. In this way, the water-swellable properties of superabsorbent particles included in a polymeric-film facing material may generally prevent water from penetrating beyond a region where the superabsorbent particles are located. For example, in one embodiment, the superabsorbent particles may prevent water from penetrating past the polymeric-film and into the core material of the panel.

In some embodiments, the superabsorbent particles may be included at the surface or at an outer layer of the polymeric-film, preventing water from penetrating past the surface or outer layer of the film. Additionally, the reversible nature of the water-swellable properties of the superabsorbent particles may provide variably enhanced breathability depending on the presence of water or moisture, while still remaining impervious to moisture. That is, the porous network of the polymeric-film facing material may allow the cementitious panel to exhibit a variable degree of breathability depending on the timing when the panel has been exposed to water or moisture. In the absence of water or moisture, the porous network of the polymeric-film facing material may allow the cementitious panel to breathe. Conversely, in the presence of water or moisture, the superabsorbent particles may swell, incrementally reducing the effective pore volume and corresponding breathability as the particles increasingly swell. Then, as the absorbed water or moisture dissipates into the atmosphere the breathability of the panels would correspondingly increase as the superabsorbent particles shrink, thereby allowing the effective pore volume to once again increase.

As mentioned, superabsorbent particles also include complexes of superabsorbent polymers and inorganic filler material. In various embodiments, one or more inorganic filler materials may be admixed or crosslinked with one or more superabsorbent polymers. Any one or more types of inorganic filler material described herein may be admixed or crosslinked with a superabsorbent polymer. Inorganic filler materials may be added to superabsorbent polymer before, during, and/or after polymerization. The inorganic filler material and the superabsorbent polymer may be physically and/or chemically associated in a form such that the polymer component and the inorganic filler material component are not readily physically separable. For example, a superabsorbent polymer particle and an inorganic filler material may be present in a single particle, as opposed to an admixture of discrete superabsorbent polymer particles and discrete inorganic filler material particles.

In one embodiment, an admixture of superabsorbent polymer particles and inorganic filler material particles may be formed by polymerizing one or more monomeric components, comminuting the resulting polymer, then adding the inorganic filler material to the comminuted polymer particles. The inorganic filler material may be added as a powder or in the form of an aqueous slurry. The polymer particles and the inorganic filler material particles may be admixed, such as by extrusion, to disperse the inorganic filler material throughout the polymer. The resulting mixture may be at least partially neutralized using a base, comminuted, dried, and sized. Additionally, or in the alternative, the superabsorbent polymer particles and inorganic filler material particles may be crosslinked (i.e., surface-crosslinked). For example, a surface crosslinking agent may be combined with the polymer particles and the inorganic filler material particles and the combination subjected to azeotropic dehydration, with crosslinking occurring during the dehydration.

Suitable surface crosslinking agents include, but are not limited to, glycidyl compounds, such as ethylene glycol diglycidyl ether, diglycidyl phosphonates, and bischlorohydrin ethers of polyalkylene glycols; alkoxysilyl compounds; polyaziridines based on polyethers or substituted hydrocarbons such as bis-N-aziridinomethane; polyamines or polyamidoamines and their reaction products with epichlorohydrin; carbonic acid derivatives, such as urea, thiourea, guanidine, dicyandiamide, 2-oxazolidinone and its derivatives, bisoxazoline, polyoxazolines, di- and polyisocyanates; di- and poly-N-methylol-compounds, such as methylenebis (N-methylolmethacrylamide) or melamine-formaldehyde resins; polyols, such as ethylene glycol, 1,2-propanediol, 1,4-butanediol, glycerol, methyltriglycol, polyethylene glycols having an average molecular weight Mw of 200-10,000, pentaerythritol, sorbitol, the ethoxylates of these polyols and their esters with carboxylic acids or carbonic acid such as ethylene-carbonate or propylene carbonate; and compounds having two or more blocked isocyanate groups such as, trimethyl-hexamethylene diisocyanate blocked with 2,2,6, 6-itetramethylpiperidin-4-one.

In embodiments where the superabsorbent particles contain a superabsorbent polymer and an inorganic filler material, the superabsorbent particles may contain from 35 wt. % to 95 wt. % of the superabsorbent polymer, such as from 50 wt. % to 90 wt. %, such as from 65 wt. % to 85 wt. % of the superabsorbent polymer. Conversely, the superabsorbent particles may contain from 5 wt. % to 65 wt. % of the inorganic filler material, such as from 5 wt. % to 60 wt. %, such as from 10 wt. % to 40 wt. %, such as from 15 wt. % to 35 wt. % of the inorganic filler material.

Superabsorbent particles may be porous or non-porous in nature, however, exemplary superabsorbent particles generally possess a porous network which may contain a combination of closed and open-celled pores. The total porosity of the superabsorbent particles may be relatively high. For example, the superabsorbent particles may exhibit a total pore area of about 2 square meters per gram ($m^2/g$) or more, in some embodiments from 10 to 160 $m^2/g$, such as from 20 to 60 $m^2/g$. The percent porosity may also be about 5% or more, such as 20% to 60%, such as from 25% to 40%. Another parameter that is characteristic of porosity is bulk density. In this regard, the bulk density of the superabsorbent particles may be less than 0.8 grams per cubic centimeter (g/cm³), such as from 0.1 to 0.6 g/cm³, such as from 0.2 to 0.6 g/cm³, as determined at a pressure of 0.58 psi via mercury intrusion.

b. Coated Filler Materials

Another type of composite filler material includes filler materials that have been coated or encapsulated with one or more coating materials. In some embodiments, the encapsulation or coating may be configured to prevent or delay water-swellable properties of the filler material until a future period or point in time. For example, the encapsulation or coating may prevent or inhibit the filler material from absorbing water or moisture during the manufacturing process of the cementitious panel, where water-swellable properties would generally be undesirable and may negatively affect crystallization of the cementitious material or other properties of the panel. In some embodiments, a coating or encapsulation may be capable of dissolving or melting, such as with exposure to water and/or temperature. For example, a coating or encapsulation may dissolve after having been exposed to a certain amount of water or moisture, such that the filler material may be exposed from the coating or encapsulation with particularly moist or wet conditions. When the coating or encapsulation dissolves, the filler material within the coating or encapsulation may be exposed, thereby allowing the filler material to absorb water or moisture that may otherwise propagate into the cementitious panel.

As another example, a coating or encapsulation may dissolve or melt under elevated temperature conditions of a kiln or oven in a typical manufacturing process for cementitious panels, such that the filler material may be exposed from the coating or encapsulation after having passed through the kiln or oven during manufacturing. In this way, the filler material may be shielded from moisture or water in the manufacturing process, yet exposed and capable of swelling to prevent or mitigate excessive moisture or water penetration thereafter.

Additionally, or in the alternative, in some embodiments, a coating or encapsulation may be capable of rupturing, for example when the continuity of a cementitious panel is interrupted such as by fasteners (e.g., nails, screws, etc.) being driven through the cementitious panel or other sources of punctures, cracks, cuts, perforations, or the like. When the coating or encapsulation ruptures, the filler material within the coating or encapsulation may be exposed, thereby allowing the filler material to absorb water or moisture that may otherwise propagate into the cementitious panel.

Coated or encapsulated filler materials may be utilized alone or together with other filler materials. In various embodiments, a coated or encapsulated filler material may be combined with another filler material to provide an admixture or complex. For example, a coated or encapsulated filler material may be physically and/or chemically associated with another filler material. Additionally, or in the alternative, a coated or encapsulated filler material may be crosslinked with one or more other filler materials.

Suitable filler materials for forming a coated filler material may be selected from any one or more organic filler materials and/or inorganic filler materials described herein. Suitable coating or encapsulating material for forming a coated or encapsulated filler material include may wax, ethyl cellulose, polyvinyl alcohol (e.g., fully hydrolyzed polyvinyl alcohol), starch, gelatin, polymeric materials, sodium alginate, epoxy resins, and the like. Additionally, suitable coating or encapsulating material may be selected from any one or more inorganic polymeric material described herein. Mixtures of any of the organic filler materials and/or inorganic filler materials described herein may be used. The specific choice of filler materials will depend upon the specific application and performance requirements of the coated filler material. The thickness of the coating or encapsulation may be selected depending upon the specific application. For a coating or encapsulation that is intended to dissolve or melt, the thickness of the coating may correlate to the degree of exposure necessary or sufficient to dissolve or melt the coating or encapsulation. A coating or encapsulation may have a micro-scale thickness or a nano-scale thickness.

In an exemplary embodiment, a coating or encapsulation may have a micro-scale thickness, with an average thickness of from 0.1 to 1,000 micrometers, such as from 0.1 to 900 μm, such as from 0.1 to 500 μm, such as from 0.1 to 250 μm, such as from 0.1 to 100 μm, such as from 0.1 to 50 μm, such as from 1 to 900 μm, such as from 1 to 100 μm, such as from 10 to 500 μm, such as from 10 to 250 μm, such as from 50 to 150 μm, such as from 100 to 250 μm, such as from 250 to 500 μm, such as from 500 to 1,000 μm, such as from 500 to 750 μm, such as from 750 to 1,000 μm. The coating or encapsulation may have an average thickness of at least 0.1 micrometer, such as at least 1 μm, such as at least 5 μm, such as at least 10 μm, such as at least 25 μm, such as at least 50 μm, such as at least 100 μm, such as at least 150 μm, such as at least 250 μm, such as at least 400 μm, such as at least 600 μm, such as at least 800 μm, The coating or encapsulation may have an average thickness of less than 1,000 micrometer, such as less than 900 μm, such as less than 700 μm, such as less than 600 μm, such as less than 500 μm, such as less than 350 μm, such as less than 225 μm, such as less than 175 μm, such as less than 125 μm, such as less than 100 μm, such as less than 100 μm, such as less than 75 μm, such as less than 40 μm, such as less than 20 μm, such as less than 10 μm, such as less than 5 μm.

In an exemplary embodiment, a coating or encapsulation may have a nano-scale thickness, with an average thickness of from 0.1 to 1,000 nanometers, such as from 0.1 to 900 nm, such as from 0.1 to 500 nm, such as from 0.1 to 250 nm, such as from 0.1 to 100 nm, such as from 0.1 to 50 nm, such as from 1 to 900 nm, such as from 1 to 100 nm, such as from 10 to 500 nm, such as from 10 to 250 nm, such as from 50 to 150 nm, such as from 100 to 250 nm, such as from 250 to 500 nm, such as from 500 to 1,000 nm, such as from 500 to 750 nm, such as from 750 to 1,000 nm. The coating or encapsulation may have an average thickness of at least 0.1 micrometer, such as at least 1 nm, such as at least 5 nm, such as at least 10 nm, such as at least 25 nm, such as at least 50 nm, such as at least 100 nm, such as at least 150 nm, such as at least 250 nm, such as at least 400 nm, such as at least 600 nm, such as at least 800 nm. The coating or encapsulation may have an average thickness of less than 1,000 micrometer, such as less than 900 nm, such as less than 700 nm, such as less than 600 nm, such as less than 500 nm, such as less than 350 nm, such as less than 225 nm, such as less than 175 nm, such as less than 125 nm, such as less than 100 nm, such as less than 100 nm, such as less than 75 nm, such as less than 40 nm, such as less than 20 nm, such as less than 10 nm, such as less than 5 nm.

Suitable polymeric materials for forming coated or encapsulated filler materials include acrylic polymers (e.g., polyacrylamide, polyacrylate, poly(acrylate-co-acrylamide)), polyvinyl alcohol polymers (e.g., hydrolyzed polyvinyl alcohol), polyamide polymers, polyurethane polymers, polyester polymers, polyether polymers, silicon-based polymers, and co-polymers of any of the foregoing, as well as mixtures of any of the foregoing.

In some embodiments, a coated or encapsulated filler material can be prepared with one or more ethylenically unsaturated monomeric compounds and/or one or more polymers, such as those described herein. In one embodiment, a filler material may be dispersed in a medium that contains a monomeric compound, and the monomeric compound may be polymerized in the presence of the filler material. In another embodiment, a filler material may be dispersed in a medium that contains a polymeric material that has already been formed. In still another embodiment, a filler material may be admixed with one or more monomeric compounds and/or polymers. Filler materials may be coated or encapsulated using any desired method known in the art, including physical or chemical methods. Exemplary physical methods include pan coating and air-suspension coating. Exemplary chemical methods include polycondensation, cross-linking, and polymerization. Any of the polymeric materials described herein may be utilized. Suitable polymeric materials for forming coated filler materials include acrylic polymers, polyurethane polymers, polyester polymers, polyether polymers, silicon-based polymers, and co-polymers of any of the foregoing, as well as mixtures of any of the foregoing.

In some embodiments, a coated filler material may include a resin-coated filler material. In some embodiments, a resin-coated filler material takes the form of one or more organic filler materials and/or inorganic filler materials dispersed as discrete domains in resin. Such resin-coated filler materials may be particularly suitable for coating the surface of facing material as described herein.

Porous Filler Materials

In some embodiments, the filler material may include porous particles, which may be organic or inorganic in composition. The porous particles may provide good hydrophobicity without requiring a hydrophobic treatment such as the addition of a hydrophobic functional group or a hydrophobic coating. The porous particles may include nanoporous particles, mesoporous particles, and/or microporous particles. Nanoporous particles have pores with a cross-sectional dimeter from 50 to 100 nanometers. Mesoporous particles have pores with a cross-sectional dimeter from 2 to 50 nanometers. Microporous particles have pores with a cross-sectional diameter from 0.2 to 2 micrometers. Exemplary inorganic porous particles include porous siliceous particles, porous aluminum oxides, porous titanium oxides, and the like. Exemplary organic porous particles include porous polymeric particles, which may be formed, for example, by combining polymers with different melting points and then heating the combination so that one polymer degrades, leaving a porous polymer matrix made up of the polymer with the higher melting point.

Coated Facing Material

In some embodiments, one or more of the sheets of facing material 104 may include a plurality of layers, such as one or more coatings applied to a polymeric-film and/or a plurality of layers of polymeric film. The one or more coatings may be applied to a drawn polymeric film regardless of whether or not the polymeric film has been or will be drawn. For a drawn polymeric film, the one or more coatings may be applied before or after drawing the polymeric film. The plurality of layers of polymeric film may include polymeric films regardless of whether or not the layers have been or will be drawn. For a drawn polymeric film that includes a plurality of layers, the one or more layers may be combined before or after drawing the polymeric film.

Figure 2:
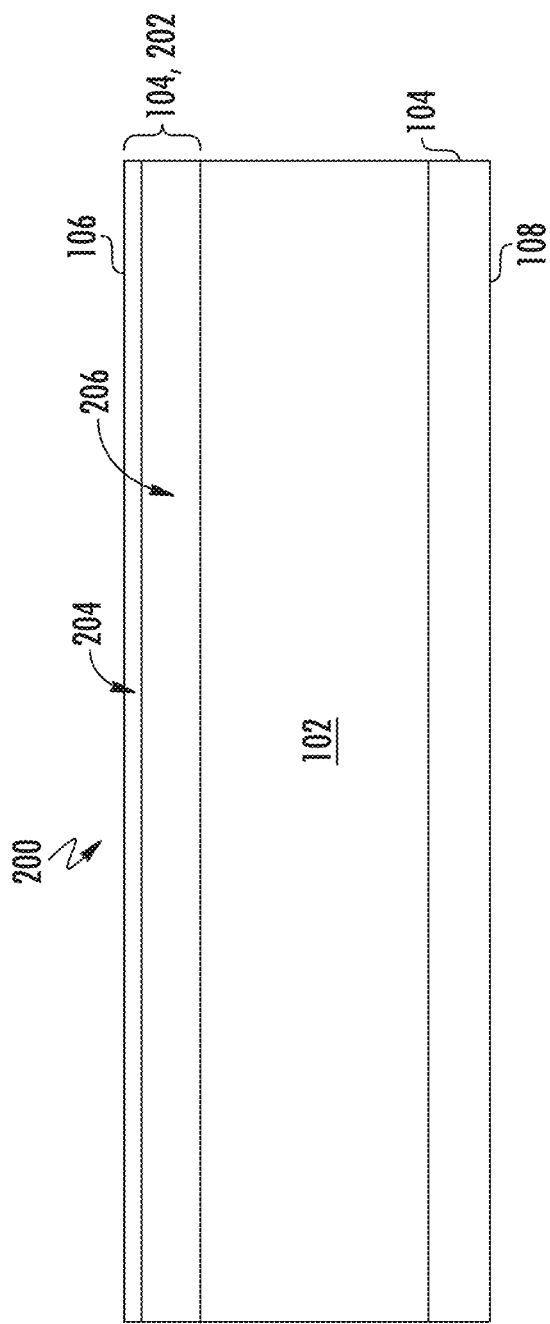
FIG. 2 schematically shows a cross-sectional view of an exemplary cementitious panel that includes a coated facing material.

FIG. 2 shows an exemplary cementitious panel 100 that includes a facing material 104 formed of a plurality of layers, which in this embodiment is a coated facing material 202. The coated facing material 202 includes a coating 204 applied to the surface of a facing material substrate 206. The coated facing material may have a plurality of layers, including at least the coating 204 and the facing material substrate 206. It will be appreciated that any number of layers may be provided. It will also be appreciated that a coating or layer may be applied in the form of a coating formulation and/or a polymeric-film. An adhesive or binder may be included to adhere multiple layers to one another, such as to adhere the coating 204 to the facing material substrate 206, and/or to adhere the coated facing material 202 to the core material 102. The adhesive or binder may be applied separately or may be included within the composition of any of the layers, such as within the composition of the coating 204 and/or the facing material substrate 206. All or at least a portion of the facing material substrate 206 may be coated with the coating 204. The coating 204 may be applied to any facing material 104. That is, the facing material substrate 206 may include a polymeric-film facing material, a paper or paperboard material, and/or woven or non-woven fibers or filaments. In some embodiments, a facing material may include a plurality of layers of polymeric-film facing material. In some embodiments, a facing material may include a polymeric-film facing material adhered to facing material that includes a paper or paperboard material, or to a facing material that includes woven or non-woven fibers or filaments.

As shown in FIG. 2, the cementitious panel 200 includes a front sheet 106 and a back sheet 108 of facing material 104, with the front sheet 106 being a coated facing material 202. However, it will be appreciated that front sheet 106 and/or the back sheet 108 of facing material 104 may take the form of a coated facing material 202. Although the coating 204 is shown as a continuous layer or film on the surface of the facing material substrate 206, at least a portion of the coating 204 may penetrate into the facing material substrate 206. Additionally, the coating 204 is preferably applied in a manner so as to not completely fill pores in the facing material substrate 206, although in some embodiments a coating may be applied so as to create a nonporous film. Such as nonporous film may be achieved, for example, by providing a polymeric coating that does not include a filler material. In one embodiment, the facing material substrate 206 may include a polymeric-film facing material that includes a drawn thermoplastic composition, and the drawn thermoplastic composition may include a polymeric matrix, a filler material, and a network of interconnected pores throughout the polymeric matrix. The coating 204 may be applied to the facing material substrate 206 before or after drawing.

In some embodiments, the coating 204 may include a filler material (e.g., an organic filler material, an inorganic filler material, or combinations thereof). The filler material included in the coating 204 may include superabsorbent particles. In some embodiments, a coating 204 may be applied to a facing material substrate 206 that takes the form of a polymeric-film facing material, providing a coated polymeric-film facing material 202. In some embodiments, a coating 204 may be applied to a substrate that includes a paper or paperboard material, providing a coated paper or paperboard facing material 202. In some embodiments, a coating may be applied to a substrate that includes woven or non-woven fibers or filaments, providing a coated woven or non-woven fiber or filament facing material 202.

A coating formulation may take the form of a water-based or solvent-based dispersion that includes an admixture of one or more of the filler materials described herein. The coating formulation may include from 60 wt. % to 98 wt. % of the dispersion of filler material, such as from 80 wt. % to 98 wt. %, such as from 90 wt. % to 98 wt. % of the dispersion of filler material based on the dry weight of the dispersion of filler material. Optionally, the coating formulation may additionally include one or more polymeric materials, such as an acrylic polymer, latex polymer, styrene-butadiene polymer, polyurethane polymer, polyester polymer, polyether polymer, silicon-based polymer, a copolymer of any of the foregoing, or a mixture of any of the foregoing. The admixture can be subjected to the high stress and/or high shear, which can be accomplished by any technique known in the art, such as liquid-liquid impingement or high-speed shearing.

In one embodiment, the aqueous phase of the water-based coating is substantially all water. However, for some monomer and/or polymer systems, it can be desired to also include a minor amount of inert organic solvent to lower the viscosity of the polymer. In certain embodiments of the present invention, the amount of organic solvent present in the water-based or aqueous dispersion is less than 20 wt. %, such as less than 10 wt. %, such as less than 5 wt. %, such as or less than 2 wt. % based on the total weight of the coating formulation. Examples of suitable solvents include, alcohols, acetones, glycols, propylene glycol monobutyl ether, ethylene glycol monohexyl ether, ethylene glycol monobutyl ether, n-butanol, benzyl alcohol, butyl cellosolve, hexyl cellosolve; butyl carbitol, butanol, 2-ethyl hexanol, tridecyl alcohol; methyl isobutyl ketone, methylpropyl ketone; butyl acetate, xylene, toluene, heptane, as well as combinations of any of the foregoing.

The coating formulation may further include a surfactant or dispersant to minimize or eliminate settling, coagulation and/or flocculation of the filler materials. The surfactant can be added at any point during formation of the dispersion of filler material and/or during formation of the coating formulation. Anionic, cationic, and nonionic surfactants are suitable, typically in an amount ranging from 1 wt. % to 10 wt. %, such as less than 2 wt. %, based on total solids present in the dispersion. Additionally, or in the alternative, the coating formulation may include a dispersion of resin-coated filler material, as these materials are relatively stable in so far as a coating formulation of resin-coated filler material typically exhibit substantially no agglomeration or settling of the resin-coated filler material upon standing. In contrast, some uncoated filler materials may not be stable and may exhibit agglomeration and/or settling upon standing.

In another embodiment, the coated facing material 202 may itself be subjected to drawing. Such drawing of a coated facing material 202 may be performed so as to form a network of interconnected pores throughout the polymeric matrix of the thermoplastic composition in the facing material substrate 206. Additionally, such drawing may form a network of interconnected pores throughout the coating 204 of the coated facing material 202. For example, a drawn coated facing material 202 may include a network of interconnected pores throughout the coating 204 and throughout the facing material substrate 206. In some embodiments, the coating 204 may itself contain a thermoplastic composition that includes a polymeric matrix and a filler material. The filler material may be at least partly incompatible with the polymeric matrix, allowing the filler material to become dispersed within the polymeric matrix. The thermoplastic composition of the coating 204 may be formed into a film by application of the coating 204 to the facing material substrate 206, and a network of interconnected pores may be formed in the coating 204 by drawing the coated facing material 202 through an extruder, calendar, press, or the like.

The thermoplastic composition included in a coating 204 may be similar or different in various aspects to a thermoplastic composition in a facing material substrate 206. In one embodiment, the coating 204 may include a thermoplastic composition that contains superabsorbent particles, such as one or more superabsorbent polymers and/or complexes or mixtures of superabsorbent polymers and/or inorganic filler materials such those described herein. The superabsorbent particles in the coating 204 may be configured to absorb water and/or moisture under sufficiently wet or moist conditions, allowing the water-swellable properties of the superabsorbent particles to at least partially block a porous network of the coating 204 and/or of the facing material substrate 206.

Although not required for many applications, a primer, sealer, or other undercoat (not shown) may be used between the coating 204 and the facing material substrate 206. Similarly, additional coating layers (not shown) can be applied on top of the coating 204. In some embodiments, a reactive filler material such as polyepoxide molecules may be included in a matrix polymer of the thermoplastic composition in the coating 204 and/or in the facing material substrate 206. Such a reactive filler material may improve bonding between the coating 204 and the facing material substrate 206 through nucleophilic ring-opening reactions with the coating 204 and/or the facing material substrate 206. Similarly, such a reactive filler material may improve bonding between the facing material substrate 206 and the core material 102.

In yet another embodiment, the coating formulation may include one or more film-forming polymers, and optionally, a curing agent. The film-forming polymers may include one or more reactive functional groups that are reactive with one or more functional groups of such a curing agent. Examples of such film-forming polymers include acrylic copolymers that have hydroxyl, epoxy, carbamate, amino or carboxylic acid reactive groups; polyester polymers and oligomers that have hydroxyl or carboxylic acid reactive groups; polyurethane polymers that have isocyanate or hydroxyl reactive groups; and polyureas that have amine or isocyanate reactive groups. Example curing agents that may be suitable include aminoplast and phenoplast resins, polyisocyanates and blocked polyisocyanates, anhydrides, polyepoxides, polyacids, polyols, and polyamines, as well as combinations of any of the foregoing. Particularly suitable curing agents for water-based coatings include carbodiamides, melamines, formaldehydes, and isocyanates. Water-based carbodiamides and isocyanates may be particularly suitable because they do not add significant amounts of organic solvents to the coating formulation. In some embodiments, the polymer(s) in which the filler material(s) are dispersed may take the form of a film-forming polymer in the coating formulation.

A curing agent may be activated upon application of the coating 204 to the facing material substrate 206. Additionally, or in the alternative, a curing agent may be activated during subsequent operations, such as exposure to a radiation source or elevated temperatures as described herein. In some embodiments, a curing agent may be partially activated upon application, and fully crosslinked during the subsequent operations.

When including a film-forming polymer, the coating formulation may include from 10 wt. % to 90 wt. % of the film-forming polymer, such as from 20 wt. % to 80 wt. % of the coating formulation based on the total weight of the coating formulation. When including a curing agent, the coating formulation may include from 2 wt. % to 50 wt. % of the curing agent, such as from 5 wt. % to 30 wt. %, such as from 10 wt. % to 20 wt. % of the curing agent based on the total weight of the coating formulation.

In addition to the components described above, a coating formulation may further include any number of other components known in the art of formulating coatings. These other components may include, for example, flow control agents, thixotropic agents, fillers, anti-gassing agents, organic co-solvents, catalysts, and the like.

In yet another embodiment, the coating 204 may take the form of a porous siliceous coating, which may exhibit good hydrophobic properties. A porous siliceous coating 204 may be formed from any one or more alkoxysilanes in an alkoxysilane-based coating formulation. Such an alkoxysilane-based coating formulation typically includes one or more alkoxysilanes and a catalyst dispersed in water or an organic solvent. The catalyst is selected to hydrolyze the alkoxysilanes, providing silanol groups.

Suitable alkoxysilanes which may be used in an alkoxysilane-based coating formulation include tetraalkoxysilanes such as tetramethoxysilane, tetraethoxysilane, tetraisopropoxysilane, tetrabutylsilane; trialkoxyfluorosilanes such as trimethoxyfluorosilane, triethoxyfluorosilane, triisopropoxyfluorosilane, tributhoxyfluorosilane; fluorine-containing alkoxysilanes such as $CF_3(CF_2)_3CH_2CH_2Si(OCH_3)_3$, $CF_3(CF_2)_5CH_2CH_2Si(OCH_3)_3$, $CF_3(CF_2)_7CH_2CH_2Si(OCH_3)_3$; trialkoxyalkylsilanes such as trimethoxymethylsilane, triethoxymethylsilane, trimethoxyethylsilane, triethoxyethylsilane, trimethoxypropylsilane, triethoxypropylsilane; trialkoxyarylsilanes such as trimethoxyphenylsilane, triethoxyphenylsilane, trimethoxychlorophenylsilane, triethoxychlorophenylsilane; trialkoxyphenethylsilanes such as trimethoxyphenethylsilane, triethoxyphenethylsilane; and dialkoxyalkylsilane such as dimethoxydimethylsilane, diethoxydimethylsilane. In some embodiments, tetraethoxysilane may be preferable.

Suitable catalysts which may be used in an alkoxysilane-based coating formulation include acid catalysts (inorganic acids or organic acids) and alkali catalysts. Examples of suitable inorganic acid catalysts include hydrochloric acid, nitric acid, sulfuric acid, fluoric acid, phosphoric acid, boric acid, and hydrobromic acid, as well as combinations of any of the foregoing. Examples of suitable organic acid catalysts include acetate, propionic acid, butanoic acid, pentanoic acid, hexanoate, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, shikimic acid, 2-ethylhexanoate, oleic acid, stearic acid, linoleic acid, linolenic acid, salicylic acid, benzoic acid, p-aminobenzoic acid, p-toluenesulfonic acid, benzenesulfonic acid, monochloroacetic acid, dichloroacetic acid, trichloroacetic acid, trifluoroacetic acid, formic acid, malonic acid, sulfonic acid, phthalic acid, fumaric acid, citric acid, tartaric acid, succinic acid, itaconic acid, mesaconic acid, citraconic acid, and malic acid, as well as combinations of any of the foregoing.

Examples of suitable alkali catalyst include sodium hydroxide, potassium hydroxide, ammonium salts, and nitrogen-containing compounds, and other basic pH modifiers. Suitable ammonium salts include tetramethylammonium hydroxide, tetraethylammonium hydroxide, tetrapropylammonium hydroxide, and tetrabutylammonium hydroxide, as well as combinations of any of the foregoing. Suitable nitrogen-containing compounds include pyridine, pyrrol, piperidine, 1-methylpiperidine, 2-methylpiperidine, 3-methylpiperidine, 4-methylpiperidine, piperazine, 1-methylpiperazine, 2-methylpiperazine, 1,4-dimethylpiperazine, pyrrolidine, 1-methylpyrrolidine, picoline, monoethanolamine, diethanolamine, dimethyl monoethanolamine, monomethyl diethanolamine, triethanolamine, diazabicyclooctane, diazabicyclononane, diazabicycloundecene, 2-pyrazoline, 3-pyrroline, quinuclidine, ammonia, methylamine, ethylamine, propylamine, butylamine, N,N-dimethylamine, N,N-diethylamine, N,N-dipropylamine, N,N-dibutylamine, trimethylamine, triethylamine, tripropylamine, and tributylamine, as well as combinations of any of the foregoing.

A porous siliceous coating 204 may be formed by evaporation and/or heating the facing material substrate 206 with the alkoxysilane-based coating formulation having been applied thereto, so as to remove the solvent and/or an alcohol component generated by the hydrolysis reaction. Such evaporation and/or heating may be carried out before or after the coated facing material 202 has been applied to the cementitious panel 200. Optionally, a surface-active agent may be included in an alkoxysilane-based coating formulation, which may provide a more uniform pore structure as described herein. Such a surface-active agent may similarly be removed by heating the coating 204.

The coating formulation may be applied to a facing material substrate 206 in advance, such that a pre-coated facing material 202 may be provided. Alternatively, the coating formulation may be applied to the facing material substrate 206 during the manufacturing process of the cementitious panel as described herein. When the coating formulation is applied during manufacturing, at least a portion of the porous structure in the resulting coating 204 may be formed when heating the cementitious panel 200 in an oven or kiln in the manufacturing line according to typical manufacturing process as described herein. Typically, the alcohol component and/or the surface-active agent may be removed by heating the coating 204 to a temperature from 200° F. to 500° F., such as from 250° F. to 450° F., such as from 325° F. to 425° F.

Regardless of the composition, a coating 204 may be applied to the facing material substrate 206 in any suitable manner, such as by spraying, painting, rolling, dipping or the like. Suitable applicators include brushes, rollers, spreaders, quills, nozzles, sprayers, and drippers, as well as combinations thereof. The coating 204 may be applied to the facing material substrate 306 at an elevated temperature or at ambient temperature. In some embodiments, the coating may be a radiation-curable coating, and the coating may be cured through radiative-curing when exposed to a radiation source such as ultraviolet radiation, infrared radiation and/or electron-beam radiation.

Fire-Resistive Capabilities

In some embodiments, a polymeric-film facing material may include one or more materials that provide fire-resistive properties. Such fire-resistive properties may be provided by way of promotion of char formation, forming an intumescent barrier, forming a glaze barrier, and/or conversion of combustible gases to non-flammable gases.

The presently disclosed polymeric-film facing materials may provide enhanced fire-resistance capabilities. Such enhanced fire-resistance capabilities may be provided by the filler materials or other materials contained therein. By way of example, suitable filler materials for providing enhanced fire-resistance capabilities include high expansion vermiculites, perlite, and calcium silicates.

In some embodiments, a polymeric-film facing material may include a filler material that exhibits intumescent properties, meaning that the swellable material may swell when exposed to heat. Such swelling may close gaps, cracks, pores, and the like in a cementitious panel, restricting air flow needed for combustion. An intumescent material may also exhibit low thermal conductivity, reducing the transfer of heat from a fire through a cementitious panel. Additionally, or in the alternative, an intumescent material may also release water vapor when heated, which may be absorbed by a water-swellable filler material, providing further swelling so as to restrict air flow through the polymeric-film facing material and/or through gaps, cracks, pores, and the like in a cementitious panel.

Exemplary intumescent materials include microporous carbonaceous soft char materials and/or hard char materials. Soft char materials may be formed from a combination of ammonium polyphosphate, pentaeyrthritol, and melamine, with a binder of vinyl acetate or styrene acrylate binder. Hard char materials include sodium silicates graphite.

In addition, or as an alternative to a swellable/intumescent material, exemplary polymeric-film facing materials may include a filler material that provides fire-resistive properties. For example, a filler material may undergo an endothermic decomposition reaction when exposed to flames or heat. Such materials may release free water as a result of endothermic decomposition, and the free water may be absorbed by a water-swellable filler material also included in the polymeric-film facing material. Exemplary endothermic materials include aluminum trihydroxide (ATH) and magnesium hydroxide. As another example, a filler material may oxidize when exposed to flames or heat, producing carbonaceous char which may prevent further combustion. Exemplary oxidizing materials include phosphates such as ammonium dihydrogenphosphate, ammonium phosphate, and/or urea phosphate.

VOC Removal Properties

In some embodiments, exemplary polymeric-film facing materials may contain one or more materials that provide VOC adsorbing properties. One or more of the presently disclosed fillers may provide VOC adsorbing properties. Exemplary materials with VOC adsorbing capabilities may include activated carbon, carbonates, bicarbonates, carbon black, aluminosilicates (i.e., zeolite, hylloysite, etc.), nanocrystalline metal oxides/hydroxides, coated metal oxides/hydroxides (i.e., halogen coatings), doped metal oxides/hydroxides, surfactant coated nanocrystalline metal oxides, mesoporous nanocrystalline metal oxides, aluminophosphates, mesoporous silica, ethylene urea and its derivatives, clays or siliceous particles (e.g., vermiculite, silica gel, etc.), and/or hydrazide compounds.

In some embodiments, a polymeric-film facing material may additionally or alternatively include a coating that contains one or more photocatalytic materials capable of converting VOCs to harmless substances in the presence of UV or other light irradiation. Exemplary photocatalytic materials include titanium dioxide and mesoporous titanium dioxide. Titanium dioxide may be doped with one or more doping agents such as nitrogen, iron, silver, palladium, platinum, cerium, zirconium, or zinc. The photocatalytic reaction may be catalyzed by a suitable light source including artificial or natural light, including UV light, florescent light, visible light, black light, and/or a combination thereof depending on the particular photocatalyst.

Pores in Facing Material

Through the techniques described above, a unique porous network may be formed in the thermoplastic composition of a polymeric-film facing material. The porous network may include pores in the filler material and/or pores in the polymer matrix. In one embodiment, the polymeric-film facing material contains a porous network that includes pores formed in the polymeric matrix. In one embodiment, the polymeric-film facing material contains a porous network that includes a porous filler material. In some embodiments, the average percent volume occupied by the pores within a given unit volume of the thermoplastic composition may be from 15% to 85% per $cm^3$, such as from 20% to 70% per $cm^3$, such as from 30% to 60% per $cm^3$ of the thermoplastic composition. With such a pore volume, the thermoplastic composition may have a relatively low density, such as about 0.90 grams per cubic centimeter or less, such as 0.85 $g/cm^3$ or less, such as 0.80 $g/cm^3$ or less, such as from 0.10 $g/cm^3$ to 0.75 $g/cm^3$, such as from 0.20 $g/cm^3$ to $0.70/cm^3$. On a coating-free basis, the pores typically constitute from 30 to 95 volume percent of the thermoplastic composition, such as from 60% to 75%.

The pores in the thermoplastic composition of the polymeric-film facing material may be of a micro-scale and/or nano-scale size. In some embodiments, the nano-scale pores may have an average cross-sectional dimension from 5 nm to less than 1000 nm, such as from 5 nm to 900 nm, such as from 10 nm to 500 nm, such as from 50 nm to 250 nm, such as 1000 nm or less, such as 900 nm or less, such as 700 nm or less, such as 500 nm or less, such as 250 nm or less, such as 150 nm or less, such as 100 nm or less, such as 75 nm or less, such as 50 nm or less, such as 10 nm or less. The pores may have an average cross-sectional dimension of 5 nm to 900 nm or less, such as 25 nm or more, such as 50 nm or more, such as 75 nm or more, such as 100 nm or more, such as 250 nm or more, such as 500 nm or more, such as 750 nm or more. The term "cross-sectional dimension" generally refers to a characteristic dimension (e.g., width or diameter) of a pore, which is substantially orthogonal to its major axis (e.g., length) and also typically substantially orthogonal to the direction of the stress applied during drawing. The pores may also have an average axial dimension within a range from 10 nm to 5000 nm, such as from 50 nm to 2000 nm, such as from 100 nm to 1000 nm. The "axial dimension" is the dimension in the direction of the major axis (e.g. length), which is typically in the direction of drawing. Such nano-scale pores may constitute 15 vol. % or more, in some embodiments about 20 vol. % or more, in some embodiments from about 30 vol. % to 100 vol. %, and in some embodiments, from about 40 vol. % to about 90 vol. % of the total pore volume in the thermoplastic filler material.

Additionally, or in the alternative, micro-scale pores may be formed in the thermoplastic composition. In some embodiments, the micro-scale pores may have an average cross-sectional dimension from 1 μm to 20 μm, such as from 5 μm to 15 μm, such as from 1 μm to 10 μm, such as from 2 μm to 5 μm, such as 15 μm or less, such as 12 μm or less, such as 9 μm or less, such as 7 μm or less, such as 5 μm or less, such as 3 μm or less. The pores may have an average cross-sectional dimension of 1 μm to 20 μm or less, such as 1 μm or more, such as 5 μm or more, such as 10 μm or more, such as 15 μm or more.

In addition to pores formed by drawing, pores may be formed by applying a coating formulation (e.g., an alkoxysilane-based coating formulation) to a facing material substrate 206 as discussed above. Typically, the pores formed in a coating 204 have a nano-scale size, such as an average cross-sectional dimension from 0.1 nm to 25 nm, such as from 0.5 nm to 20 nm, such as from 1 nm to 15 nm, such as from 2 nm to 10 nm. The pores may have an average cross-sectional dimension of 9 nm or less, such as 7 nm or less, such as 5 nm or less, such as 3 nm or less, such as 1 nm or less, such as 0.5 nm or less, such as 0.1 nm or less. The pores formed in the coating 204 may have an average cross-sectional dimension of 0.2 nm to 25 nm, such as 0.5 nm or more, such as 1 nm or more, such as 5 nm or more, such as 10 nm or more. The may pores have may have an average cross-sectional dimension of 15 nm or more, such as 20 nm or more. Additionally, or in the alternative, pores may be formed in a coating 204 by drawing a coated polymeric-film filler material as described herein. The pores formed by drawing a coated polymeric-film filler material may provide micro-scale and/or nano-scale pores in the coating 204 and/or the facing material substrate 206 of a size corresponding to the pore sizes described above with respect to the thermoplastic composition. It will be appreciated that the pores in the coating 204 the facing material substrate 206 need not be of the same size. For example, the pores in the coating 204 may be smaller than the pores in the facing material substrate 206.

The polymeric-film facing material may be substantially impervious to liquid water yet "breathable" in the sense of being pervious to water vapor and gases.

The "breathability" of the polymeric-film facing material may be measured in terms of water vapor transmission rate (WVTR), which generally refers to the rate at which water vapor permeates through a material as measured in units of grams per meter squared per 24 hours ($g/m^2/24$ hrs). Higher WVTR values represent a more breathable material and lower WVTR values represent a less breathable material. The test used to determine the WVTR of a material may vary based on the nature of the material. For example, one technique for measuring WVTR involves the use of a PERMATRAN-W 100K water vapor permeation analysis system, which is commercially available from Modern Controls, Inc. of Minneapolis, Minn. Such a system may be particularly well suited for materials thought to have a WVTR of greater than about 2,000 $g/m^2/24$ hrs. It should be understood, however, that other systems and techniques for measuring WVTR may also be utilized in the present invention. Another technique for measuring WVTR is provided by ASTM E96, Standard Test Methods for Water Vapor Transmission of Materials.

An exemplary polymeric-film facing materials may exhibit a surface water resistance according to ASTM C-473 such that the panel absorbs less than 10% of water, such as less than 7.5%, less than 5%, less than 1%, or less than 0.5%, or less than 0.25%. Regardless, a breathable polymeric-film facing material should have sufficient permeability to allow for water vapor to pass through when drying the panels in the oven or kiln. In an exemplary embodiment, the pore structure of the polymeric-film facing material allows it to exhibit a high breathability, such as a WVTR of about 100 to about 10,000 grams/$m^2$-24 hours, such as about 500 to about 10,000 grams/$m^2$-24 hours, such as about 1,000 to about 10,000 grams/$m^2$-24 hours, such as about 1,000 to about 6,000 grams/$m^2$-24 hours, such as about 1,000 to about 5,000 grams/$m^2$-24 hours, such as about 5,000 to about 10,000 grams/$m^2$-24 hours, such as about 5,000 to about 7,000 grams/$m^2$-24 hours, such as about 7,000 to about 10,000 grams/$m^2$-24 hours, such as about 100 grams/$m^2$-24 hours or more, such as about 500 grams/$m^2$-24 hours or more, such as about 1,000 grams/$m^2$-24 hours or more, such as about 2,000 grams/$m^2$-24 hours or more, such as about 5,000 grams/$m^2$-24 hours or more, such as about 7,000 grams/$m^2$-24 hours or more, or such as about 10,000 grams/$m^2$-24 hours or more. The polymeric-film facing material may also limit the amount of liquid water that passes therethrough upon the application of pressure, i.e., it resists a hydrostatic pressure ("hydrohead") of about 50 millibar or more, in some embodiments about 70 millibar or more, in some embodiments about 80 millibar or more, and in some embodiments, about 100 millibar or more without allowing liquid water to pass. A non-breathable polymeric film facing material may exhibit a WVTR of less than about 100 grams/$m^2$-24 hours, such as less than 50 grams/$m^2$-24 hours, such as less than 25 grams/$m^2$-24 hours.

A breathable polymeric-film facing material may exhibit a porosity from 10 to 20,000 sec/100cc air, as determined according to ASTM D 726, such as from 10 to 100 sec/100 cc air, such as from 100 to 1,000 sec/100 cc air, such as from 1,000 to 5,000 sec/100 cc air, such as from 5,000 to 10,000 sec/100 cc air, such as from 1,000 to 10,000 sec/100 cc air, such as from 10,000 to 15,000 sec/100 cc air, such as from 15,000 to 20,000 sec/100 cc air, such as from 10,000 to 20,000 sec/100 cc air. The polymeric-film facing material may exhibit a porosity greater than 10 sec/100 cc air, such as greater than 50 sec/100 cc air, such as greater than 100 sec/100 cc air, such as greater than 200 sec/100 cc air, such as greater than 500 sec/100 cc air, such as greater than 1,000 sec/100 cc air, such as greater than 2,500 sec/100 cc air, such as greater than 5,000 sec/100 cc air, such as greater than 7,500 sec/100 cc air, such as greater than 10,000 sec/100 cc air, such as greater than 12,500 sec/100 cc air, such as greater than 15,000 sec/100 cc air. The polymeric-film facing material may exhibit a porosity less than 20,000 sec/100 cc air, such as less than 15,000 sec/100 cc air, such as less than 12,500 sec/100 cc air, such as less than 10,000 sec/100 cc air, such as less than 7,500 sec/100 cc air, such as less than 5,000 sec/100 cc air, such as less than 2,500 sec/100 cc air, such as less than 1,000 sec/100 cc air, such as less than 500 sec/100 cc air, such as less than 200 sec/100 cc air, such as less than 100 sec/100 cc air, such as less than 50 sec/100 cc air. A non-breathable polymeric-film facing material may exhibit a porosity from 25,000 sec/100cc air to 200,000 sec/100 cc air, as determined according to ASTM D 726, such as from 50,000 to 100,000 sec/100 cc air.

One category of particularly suitable polymeric-film facing materials includes microporous polymeric films formed from a polyolefin film combined with an inorganic filler material such as siliceous particles. Such polymeric films are available under the designation TESLIN® from PPG Industries, Inc. of Monroeville, Pa. These polymeric films include SP 600, SP 700, SP 800, SP 1000, SPID 1000, SP 1000 Blue, IMP 1000, Digital 1000, SP 1200, SP 1400, SPID 1400, HD 1400, SP 1800. Such polymeric-film facing materials have a thickness from 125 to 100 μm, and a density ranging from 0.6 g/$cm^3$ to 08 g/$cm^3$. For example, TESLIN® SP 1000 has a thickness of about 255 μm and a density of 0.68 g/$cm^3$, and TESLIN® SP 1200 has a thickness of about 305 μm 0.68 g/$cm^3$. Such TESLIN material may exhibit a porosity of between 10,000 sec/100cc to 12,000 sec/100 cc, as determined according to ASTM D 726.

Another exemplary polymeric-film facing material includes microporous polymeric films formed from a polyester material such as polyethylene terephthalate combined with an inorganic filler material such as siliceous particles. Such polymeric films are available under the designation TESLIN® LUMIT™ (from PPG Industries, Inc. of Monroeville, Pa.

Applications

The cementitious panel, such as the gypsum board, may be utilized in a variety of applications. Depending on the application, it may be desired to have a panel wherein the polymeric-film facing material is manipulated or modified to provide a certain appearance or functionality. For instance, in one embodiment, the polymeric-film facing material may be embossed. In particular, the embossing may result in a particular pattern in order to provide an appealing facing material. Such embossing may also result in a functional texture that may help distinguish certain products from one another. Regardless of the pattern and the purpose, it should be understood that the manner in which the polymeric-film facing material may be embossed is not limited by the present invention. For instance, without intending to be limited, embossing or gravure rolls may be utilized to emboss the polymeric-film facing material. In addition, the embossing may be performed prior to introducing the polymeric-film facing material onto the production line. Alternatively, the embossing may be performed on the production line. For instance, while supplying the polymer-film facing material and prior to deposition, the material may undergo embossing. In addition, in one embodiment, the embossing may be performed even after the polymeric-film facing material is provided onto the cementitious panel. For instance, the embossing may be conducted prior to introduction into the kiln or dryer. In another embodiment, the embossing may be conducted after the kiln or dryer. Thus, as indicated, the manner and method in which the embossing is conducted is not limited by the present invention.

Manufacturing System

Figure 3:
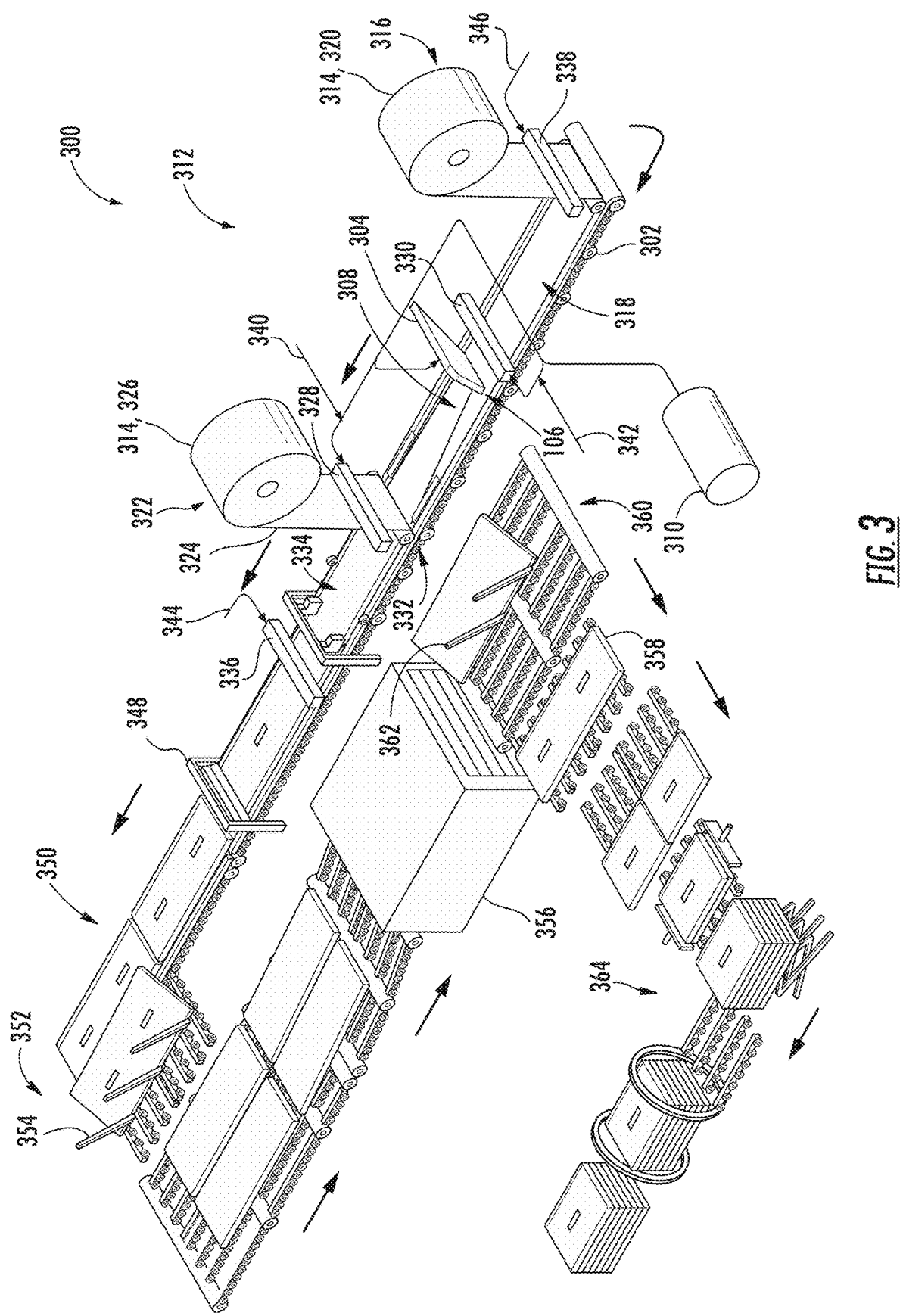
FIG. 3 schematically shows an exemplary system for manufacturing a cementitious panel.

Now referring to FIG. 3, an exemplary system 300 for manufacturing cementitious panels is shown. The exemplary system 300 includes a conveyor assembly 302 such as a continuous belt or fabric, a cementitious core material supply manifold 304 positioned above a surface of the continuous belt or fabric of the conveyor assembly 302. The cementitious core material supply manifold 304 includes an outlet 306 such as a chute or "boot" configured to apply a slurry of cementitious core material 308 so as apply a layer of cementitious core material 308 which will be formed into the core layer 102 of a cementitious panel 100. The slurry of cementitious core material 308 may be provided from a mixing apparatus 310, such as a pin mixer. The slurry of cementitious core material 308 may be provided by mixing dry and wet ingredients in the mixing apparatus 310. The dry ingredients can include, but are not limited to, any combination of cementitious material such as calcium sulfate hemihydrate and known additives, such as fiberglass, accelerator, and in some cases natural or synthetic polymers (e.g., starch). The wet ingredients can be made of many components, including but not limited to, surfactants, dispersants, defoamers, retarders, rheology modifiers, a mixture of water, paper pulp, and other additives, such as potash and natural or synthetic polymer (e.g., starch). The exemplary system 300 may further includes a facing material supply assembly 312 configured to supply to the conveyor assembly 302 a plurality of sheets of facing material 104 from a plurality of facing material supply rolls 314. In one embodiment, the plurality of sheets of facing material include an upper sheet and a lower sheet. For purposes of convenience, the lower sheet refers to the sheet of facing material that is closer to the conveyor assembly 302, and the upper sheet refers to the sheet of facing material that is further away from the conveyor assembly. Typically, cementitious panels are formed front-side down, such that the lower sheet corresponds to the front-side of the panel. However, cementitious panels may also be formed back-side down, such that the lower sheet corresponds to the back-side of the panel. The exemplary embodiments that follow describe a system for manufacturing cementitious panels in which the panels are formed front-side down. However, these examples are provided by way of illustration only and should not be interpreted at limiting the present disclosure.

As shown in FIG. 3, a lower facing material supply assembly 316 supplies a lower sheet of facing material 318 to the conveyor assembly 302 from a lower facing material supply roll 320. An upper facing material supply assembly 322 supplies an upper sheet of facing material 324 to the conveyor assembly 302 from an upper facing material supply roll 326. The slurry of cementitious core material 308 flows from the outlet 306 and spreads onto a moving continuous lower sheet of facing material 318, while a moving continuous upper sheet of facing material 314 is applied on the slurry of cementitious material 308. The exemplary system 300 may further include a dense layer applicator assembly configured to apply a dense layer 110 to the upper sheet of facing material 324 and/or to the lower sheet of facing material 318 upstream from the supply manifold 304.

As shown, the system 300 includes an upper dense layer applicator assembly 328 and a lower dense layer applicator assembly 330. The upper dense layer applicator assembly 328 may include for example, a roller assembly and/or a nozzle assembly configured to apply a slurry of cementitious material 308 to the inward side of the upper sheet of facing material 324 in a manner such that the slurry forms a dense layer 110. Similarly, the lower dense layer applicator assembly 330 may include for example, a roller assembly and/or a nozzle assembly configured to apply a slurry of cementitious material 308 to the inward side of the lower sheet of facing material 318 in a manner such that the slurry forms a dense layer 110.

The slurry of cementitious material 308 used to form a dense layer may be of similar composition to that used to form the core layer 102 except that the dense layer typically exhibits a greater concentration of gypsum crystals and a lower concentration of void volumes. This may be accomplished through the manner in which the slurry of cementitious material 308 is applied when forming the dense layer 110. For example, the dense layer applicator assembly may be configured to reduce minimize the introduction of air that may generate foam. Additionally, or in the alternative, the concentration of wet ingredients (e.g., defoamer or dispersant) may be modified to achieve the desired dense layer properties. In some embodiments, the slurry of cementitious material 308 used to form the dense layer may be supplied to the upper and/or lower dense layer applicator assembly 328, 330 from the same mixing apparatus 310 from which cementitious material 308 is supplied to the supply manifold 304. Alternatively, a separate or additional mixing apparatus (not shown) may be utilized to supply cementitious material to the upper and/or lower dense layer applicator assembly 328, 330. For example, a separate or additional mixing apparatus may be utilized when desiring to include different ingredients or different concentrations of ingredients in the dense layer 110.

The exemplary system 300 further includes a forming assembly 332 configured to form a continuous length of cementitious panel material 334 to a desired thickness and width. At the forming assembly, the lower sheet of facing material 318 and/or the upper sheet of facing material 324 may be folded, wrapped, and/or pressed, or the like, so as to surround the slurry of cementitious core material 308. For example, the lower sheet of facing material 318 may wrap around the slurry of cementitious core material 308 and onto the upper sheet of facing material 324. Alternatively, or in addition, the upper sheet of facing material 324 may wrap around the slurry of cementitious core material 308 and onto the lower sheet of facing material 318. An adhesive may be utilized for adhering the upper sheet of facing material and the lower sheet of facing material 318 to one another.

In some embodiments, the exemplary system may include a coater assembly system configured to apply a coating to the upper sheet of facing material 324 and/or to the lower sheet of facing material 318. As shown, the system 300 includes an upper coater assembly 336 and a lower coater assembly 338. The upper coater assembly 336 may include for example, a roller assembly and/or a nozzle assembly configured to apply a coating to the outward side of the upper sheet of facing material 324. Similarly, the lower coater assembly 338 may include for example, a roller assembly and/or a nozzle assembly configured to apply a coating to the outward side of the lower sheet of facing material 318. Such a coating may be applied to the upper or lower sheet of facing material 324, 318 so as to provide a facing material 104 with a plurality of layers. For example, a facing material 104 may include a first layer 116 of facing material 104 applied to a second layer 118 of facing material 104 using a coater assembly 336, 338. The upper coater assembly 336 and/or the lower coater assembly 338 may be located either upstream or downstream from the forming assembly 332. As shown, the upper coater assembly 336 is located downstream from the forming assembly 332 and the lower coater assembly 338 is located upstream from the forming assembly 332. A coater assembly 336, 338 may be desirable for providing coatings with different formulations or properties, such as formulations or properties that may vary as between different grades of cementitious panels 100. Alternatively, or in addition, cementitious panels may be formed using facing material that has already been coated. For example, the facing material supply rolls 314 may supply a facing material that has a plurality of layers, including a coated facing material.

Filler materials may be included in the core layer 102, the facing material 104, and/or the dense layer 110 of a cementitious panel 100. The filler material may be supplied from a storage tank (not shown), which may be provided in the form of a permanent tank, a portable tote, or rolling stock equipped with a tank or tote. In some embodiments, filler material may be introduced into the mixing apparatus 310 as a dry ingredient and/or as a wet ingredient. A slurry of cementitious core material 308 supplied from the mixing apparatus 310 may thereby include a filler material. A slurry cementitious core material 308 that includes a filler material may be supplied to the supply manifold 304 so as to form cementitious panels 100 that include filler material in the core layer 102. Additionally, or in the alternative, a slurry cementitious core material 308 that includes a filler material may be supplied to the upper dense layer applicator assembly 328 and/or to the lower dense layer applicator assembly 330 so as to form cementitious panels 100 that include filler material in the dense layer 110.

In some embodiments, a filler material may be introduced to the upper dense layer applicator assembly 328 and/or to the lower dense layer applicator assembly 330 through a dense layer supply line. As shown, an upper dense layer supply line 340 may supply a filler material to the upper dense layer applicator assembly 328, and a lower dense layer supply line 342 may supply a filler material to the lower dense layer applicator assembly 330. The upper dense layer supply line 340 and/or the lower dense layer supply line 342 may be utilized to introduce filler material to the corresponding dense layer(s) in different quantities than that of the central core layer 103 and/or to introduce filler material to the dense layer(s) that differ in composition from filler material introduced into the central core layer 103. For example, in one embodiment, a filler material may be included in the dense layer(s) without including the filler material in the central core layer 103. In another embodiment, the dense layer(s) may include a first filler material and the central core layer 103 may include a second filler material, in which the first filler material differs from the second filler material in respect of concentration and/or composition.

In some embodiments, a filler material may be introduced to the upper coater assembly 336 and/or to the lower coater assembly 338 through a coater assembly supply line. As shown, an upper coater assembly supply line 344 may supply a filler material to the upper coater assembly 336, and a lower coater assembly supply line 346 may supply a filler material to the lower coater assembly 338. In some embodiments, the upper coater assembly 336 may be used to introduce a filler material to the upper sheet of facing material 324 and/or the lower coater assembly 338 may be used to introduce a filler material to the lower sheet of facing material 318. Additionally, or in the alternative, cementitious panels may be formed using facing material that already includes filler material. For example, the facing material supply rolls 314 may supply a facing material that includes a filler material.

After passing through the forming assembly 332, the continuous length of cementitious panel material 334 is cut with a cutting device 348 such as a saw blade, water knife, or other suitable device to provide a series of sequential cementitious panels 350 of a desired length. Typically, the cutting device 348 will be positioned a sufficient distance downstream from the forming assembly 332 such that the core material has set sufficiently to retain its shape. In some embodiments, vacuum boxes may be positioned along the conveyor assembly 302 to remove excess water.

The cementitious panels 350 continue along the conveyor assembly 302 for some distance, allowing the cementitious core material to further cure. Typically, the cementitious panels 350 are formed front-side down, and after the cementitious panels 350 have sufficiently cured, they are typically turned front-side up at a wet transfer table 352 to protect the front side of the panels from being damaged by the conveyor assembly 302. The wet transfer table 352 may include an articulating lifting and lowering mechanism 354, which has a first set of forks or arms that lift the cementitious panel from its first broad face onto its edge, and a second set of forks or arms that lower the cementitious panel onto its opposite side, bringing the cementitious panel to rest on its second broad face. The cementitious panels 350 are dried in an oven or kiln 356 or other suitable drying apparatus to evaporate excess (free) water while chemically bound water is retained in gypsum crystals formed through the curing process. The cementitious panels 350 are typically dried front-side up, as the wet transfer table 352 with an articulating lifting and lowering mechanism 354 is typically provided to turn the cementitious panel over prior to heating the cementitious panel in the oven or kiln 356. Typically, the cementitious core material 308 partially sets prior to being heated in the oven or kiln 356, and then further at least partially sets during heating in the oven or kiln 356. After exiting the oven or kiln 356, dried cementitious panels 358 are bundled in pairs of two or as needed, with front-sides facing one another, at a dry transfer table 360. The dry transfer table typically includes a similar articulating lifting and lowering mechanism 362, which lifts and lowers a first cementitious panel on top of a second cementitious panel. The dried panels 358 may be further cut to desired sizes and bundled together for transfer to a warehouse or for shipping, using various forms of finishing equipment 364.

Figure 4:
FIG. 4 shows a flowchart depicting an exemplary method of manufacturing a cementitious panel.
Figure 4:

Now turning to FIG. 4, exemplary methods of manufacturing cementitious panels will be discussed. Exemplary methods may be performed using the exemplary system 300 described herein, including any combination or arrangement of various features of such systems. Additionally, exemplary methods may be performed to make any of the cementitious panels described herein, including any combination or arrangement of various features of such panels. An exemplary method 400 includes conveying with a conveyor assembly, a slurry of cementitious core material and a plurality of sheets of facing material 402. The plurality of sheets of facing material include a first sheet of facing material and a second sheet of facing material, with the first sheet of facing material and/or the second sheet of facing material being a polymeric-film. The exemplary method 400 proceeds by forming with a forming assembly, a continuous length of cementitious panel material comprising the slurry of cementitious core material surrounded by the plurality of sheets of facing material 406, and cutting the continuous length of cementitious panel material laterally to a desired length, providing a cementitious panel.

EXAMPLE

Figure 5:
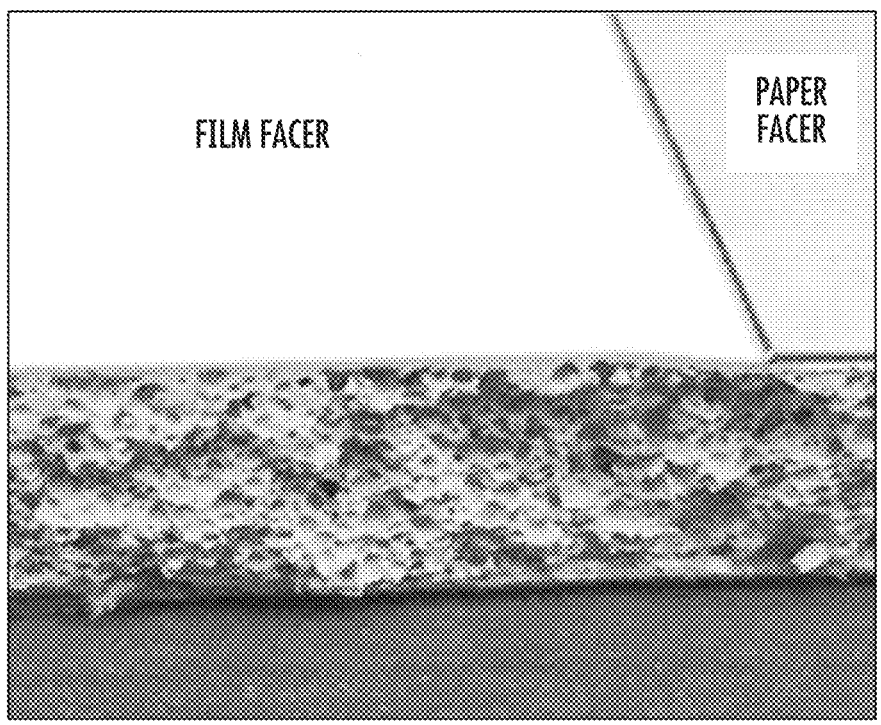
FIG. 5 is a photographic image showing a perspective cross-sectional view an exemplary cementitious panel.
Figure 6:
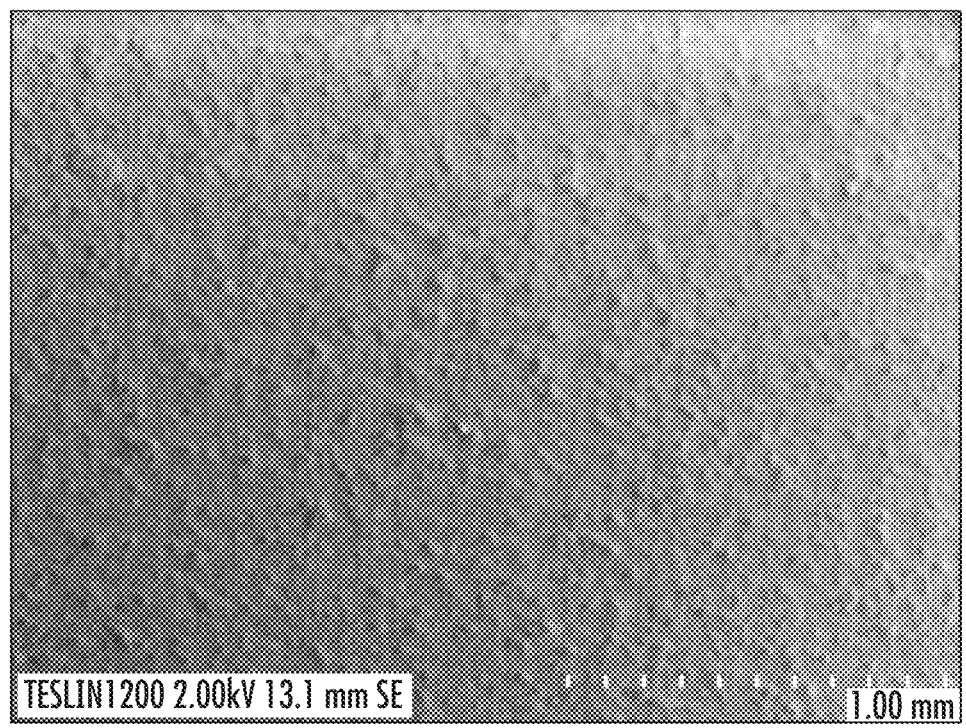
FIG. 6 is an SEM image of the surface of the polymeric-film facing material of the cementitious panel of FIG. 5.

A cementitious panel 100 was formed using a polymeric-film for the front sheet 106 of facing material 104 and a paper material for the back sheet 108 of facing material. FIG. 5 shows a perspective cross-sectional view of the cementitious panel 100. The polymeric-film facing material was formed of TESLIN® SP1200, with 60 wt. % silica. FIG. 6 is an SEM image of the surface of the polymeric-film facing material of the cementitious panel of FIG. 5. The polymeric-film facing material of the cementitious panel shown in FIGS. 5 and 6 has a smooth surface that may pass Level 5 standards for smoothness. The polymeric film-facing material is paintable and may be used with joint compound. The polymeric-film facing material shown in FIGS. 5 and 6 exhibited a porosity of 11,117 sec/100 cc air, as determined according to ASTM D 726.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cementitious panel, comprising:
   a cementitious core material;
   a plurality of sheets of facing material sandwiching the cementitious core material, the plurality of sheets of facing material comprising a first sheet of facing material and a second sheet of facing material;
   wherein the first sheet of facing material and/or the second sheet of facing material comprises a polymeric-film, the polymeric-film being pervious to water vapor and gases, the polymeric-film containing a thermoplastic composition comprising a polymeric matrix comprising one or more polymeric materials and a filler material, the filler material being dispersed in the polymer matrix, the polymer matrix comprising a network of interconnected pores, the polymer matrix comprising a matrix polymer, wherein the matrix polymer comprises a polyolefin.

2. The cementitious panel of claim 1, wherein the polymeric matrix further comprises a polyester, a polyamide, a polyimide, a polysulfonate, a polytetrafluoroethylene, and/or a polyvinylidene difluoride.

3. The cementitious panel of claim 1, wherein the filler material comprises one or more organic filler materials and/or inorganic filler materials.

4. The cementitious panel of claim 1, wherein the filler material comprises particles and/or discrete domains of a micro-scale size, the particles and/or discrete domains having an average cross-sectional dimension from 1 μm to 2000 μm.

5. The cementitious panel of claim 1, wherein the filler material comprises particles and/or discrete domains of a nano-scale size, the particles and/or discrete domains having an average cross-sectional dimension from 1 nm to 1000 nm.

6. The cementitious panel of claim 3, wherein the organic filler material comprises a superabsorbent polymer.

7. The cementitious panel of claim 3, wherein the inorganic filler material comprises siliceous particles and/or particles of aluminum oxides, titanium oxides, zinc oxides, antimony oxides, zirconia, magnesia, zinc sulfide, barium sulfate, strontium sulfate, cesium oxide, yttrium oxide, colloidal yttria, zirconia, colloidal zirconia, calcium carbonate, magnesium carbonate, and/or magnesium hydroxide.

8. The cementitious panel of claim 3, wherein the inorganic filler material comprises a polyphosphazene, a polysilane, a polysiloxane, a polygermane, a polymeric sulfur, a polymeric selenium, a silicone, an aluminum-containing polymer, and/or a ferrocene-containing polymer.

9. The cementitious panel of claim 1, wherein the filler material comprises one or more pigments, the one or more pigments comprising an azo compound, a heterocyclic pigment, a bicyclic pigment, and/or a polycyclic pigment.

10. The cementitious panel of claim 1, wherein the filler material comprises a complex and/or a mixture, the complex and/or mixture comprising one or more superabsorbent polymers and one or more inorganic filler materials.

11. The cementitious panel of claim 1, wherein the filler material comprises a swellable material.

12. The cementitious panel of claim 11, wherein the swellable material comprises a superabsorbent polymer and an inorganic filler material crosslinked and/or admixed with the superabsorbent polymer.

13. The cementitious panel of claim 1, wherein the filler material comprises a porous filler material.

14. The cementitious panel of claim 13, wherein the pores have a nano-scale size comprising an average cross-sectional dimension from 1 nm to 1000 nm.

15. The cementitious panel of claim 13, wherein the pores have a micro-scale size comprising an average cross-sectional dimension from 0.1 μm to 20 μm.

16. The cementitious panel of claim 1, wherein the first sheet of facing material and/or the second sheet of facing material comprises one or more coatings and/or a plurality of layers.

17. The cementitious panel of claim 16, wherein the one or more coatings comprises a filler material.

18. The cementitious panel of claim 16, wherein the one or more coatings comprises a porous siliceous coating formed from one or more alkoxysilanes.

19. The cementitious panel of claim 16, wherein the one or more coating comprises pores that have an average cross-sectional dimension from 0.1 nm to 25 nm.

20. The cementitious panel of claim 1, wherein the cementitious panel exhibits a surface water resistance according to ASTM C-473 such that the panel absorbs less than 10% of water.

21. A cementitious panel, comprising:
a cementitious core material;
- a plurality of sheets of facing material sandwiching the cementitious core material, the plurality of sheets of facing material comprising a first sheet of facing material and a second sheet of facing material;
- wherein the first sheet of facing material and/or the second sheet of facing material comprises a polymeric-film, the polymeric-film having a thickness from 0.5 μm to 500 μm, the polymeric-film being pervious to water vapor and gases, the polymeric-film containing a thermoplastic composition comprising a polymeric matrix comprising one or more polymeric materials and a filler material, the filler material being dispersed in the polymer matrix, the polymer matrix comprising a network of interconnected pores, the polymer matrix comprising a matrix polymer, wherein the matrix polymer comprises a polyolefin.

22. The cementitious panel of claim 3, wherein the inorganic filler material comprises a swellable clay.

* * * * *